United States Patent
Chi et al.

(10) Patent No.: US 12,323,783 B2
(45) Date of Patent: Jun. 3, 2025

(54) GENERATING RESTORED SPATIAL AUDIO SIGNALS FOR OCCLUDED MICROPHONES

(71) Applicant: QUALCOMM Incorporated, San Diego, CA (US)

(72) Inventors: Sanghyun Chi, San Diego, CA (US); Dinesh Ramakrishnan, Irvine, CA (US); Krishna Kumar Malthakal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 18/048,387

(22) Filed: Oct. 20, 2022

(65) Prior Publication Data

US 2024/0137720 A1  Apr. 25, 2024
US 2024/0236595 A9  Jul. 11, 2024

(51) Int. Cl.
| | |
|---|---|
| H04S 7/00 | (2006.01) |
| G06F 16/632 | (2019.01) |
| H04R 3/00 | (2006.01) |
| H04R 5/027 | (2006.01) |
| H04R 5/033 | (2006.01) |
| H04R 29/00 | (2006.01) |
| H04S 1/00 | (2006.01) |

(52) U.S. Cl.
CPC .............. *H04S 7/30* (2013.01); *G06F 16/632* (2019.01); *H04R 3/005* (2013.01); *H04R 5/027* (2013.01); *H04R 5/033* (2013.01); *H04R 29/005* (2013.01); *H04S 1/007* (2013.01); *H04R 2499/11* (2013.01); *H04S 2400/11* (2013.01); *H04S 2400/15* (2013.01)

(58) Field of Classification Search
CPC ........ H04S 7/30; H04S 1/007; H04S 2400/11; H04S 2400/15; G06F 16/632; H04R 3/005; H04R 5/027; H04R 5/033; H04R 29/005; H04R 2499/11
USPC ...................................... 381/26, 56, 91, 303
See application file for complete search history.

(56) References Cited

U.S. PATENT DOCUMENTS

| | | | |
|---|---|---|---|
| 2013/0332156 A1* | 12/2013 | Tackin ................. | H03G 3/3005 704/226 |
| 2015/0271593 A1* | 9/2015 | Sun ......................... | H04N 7/15 381/92 |
| 2015/0312691 A1* | 10/2015 | Virolainen ........... | H04R 29/005 381/58 |
| 2017/0263267 A1* | 9/2017 | Dusan .................. | H04R 1/1083 |
| 2018/0262831 A1 | 9/2018 | Matheja et al. | |
| 2021/0012787 A1* | 1/2021 | Chi ..................... | G10L 21/0264 |
| 2021/0208842 A1* | 7/2021 | Cassidy ................. | G11B 27/28 |

OTHER PUBLICATIONS

International Search Report and Written Opinion—PCT/US2023/076018—ISA/EPO—Jan. 22, 2024.

* cited by examiner

*Primary Examiner* — William A Jerez Lora
(74) *Attorney, Agent, or Firm* — QUALCOMM Incorporated; Espartaco Diaz Hidalgo

(57) ABSTRACT

Systems and techniques are provided for performing spatial audio recording. For instance, a process can include detecting an occlusion for at least one audio frame of one or more audio frames associated with a spatial audio recording. During the spatial audio recording, the process can further include selecting, based on detection of the occlusion, at least one of an occluded spatial filter for the one or more audio frames or a non-occluded spatial filter for the one or more audio frames.

58 Claims, 17 Drawing Sheets

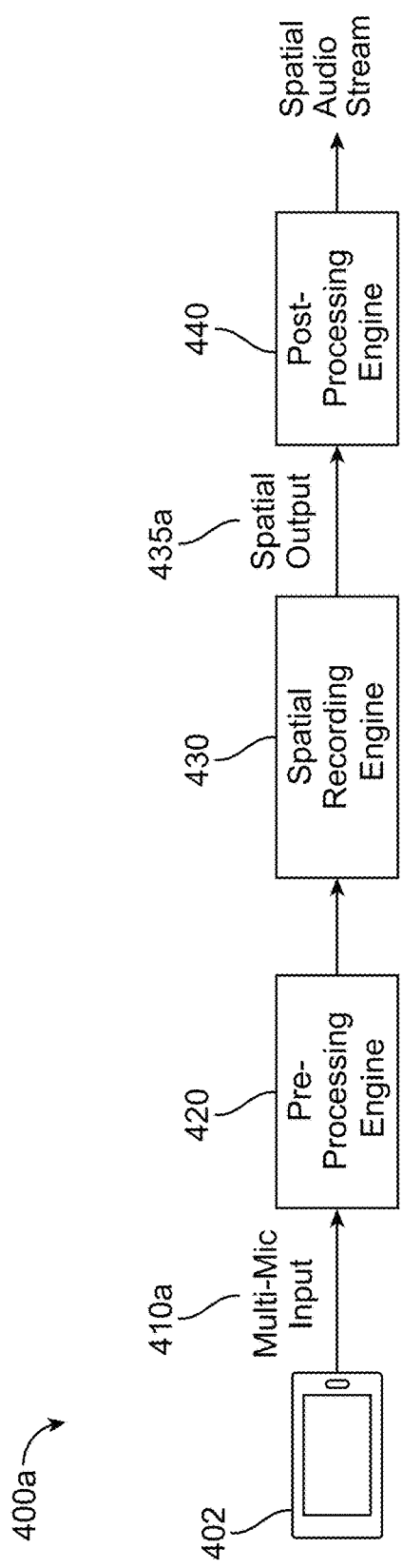
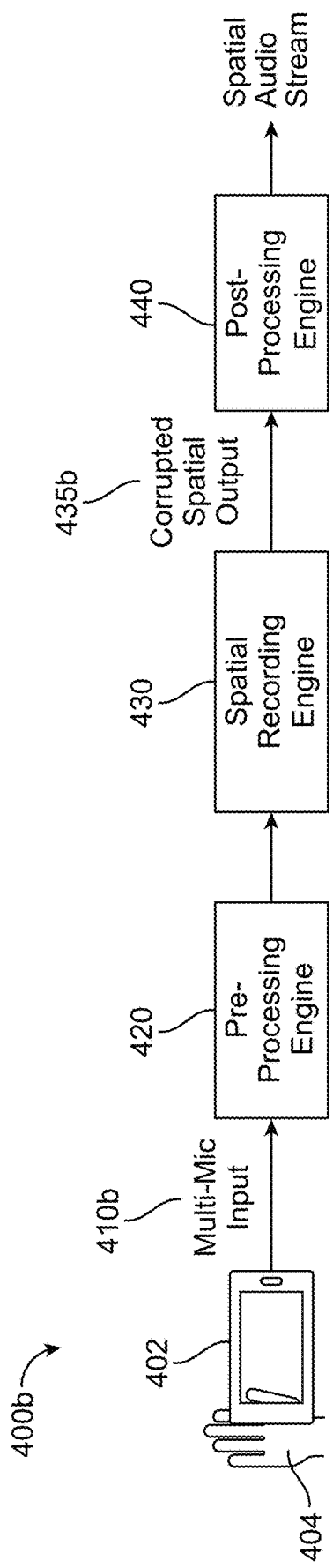
FIG. 4A
FIG. 4B

1600

Detect An Occlusion Of One Or More Microphones Associated With At Least One Audio Frame Of One Or More Audio Frames Associated With A Spatial Audio Record
1602

↓

Select, Based On The Detection Of The Occlusion, At Least One Of An Occluded Spatial Filter For The One Or More Audio Frames Or A Non-Occluded Spatial Filter For The One Or More Audio Frames
1604

GENERATING RESTORED SPATIAL AUDIO SIGNALS FOR OCCLUDED MICROPHONES

FIELD

The present disclosure generally relates to audio signal processing. For example, aspects of the present disclosure relate to restoring spatial audio during one or more microphone occlusion events.

BACKGROUND

Spatialized audio rendering systems output sounds that may enable user perception of a three-dimensional (3D) audio space. Spatial audio (also referred to as three-dimensional or 3D audio) can refer to a variety of sound playback technologies that make it possible for a listener to perceive sound all around themselves, without the need for a multiple speaker setup. For example, spatial audio technologies can cause a listener to perceive three-dimensional sound (e.g., spatial audio) based on emulating the acoustic interaction between real-world sound waves and the listener's ears. The interaction between sound waves and hearing anatomy, including the shape of the ears and the head, can be used to provide spatial audio to a listener. For example, one or more Human Related Transfer Functions (HRTFs) or other spatial sound filters can be used to enable user perception of a 3D audio space.

For example, a user may be wearing headphones, an augmented reality (AR) head mounted display (HMD), or a virtual reality (VR) HMD, and movement (e.g., translational or rotational movement) of at least a portion of the user may cause a perceived direction or distance of a sound to change. For example, a user may navigate from a first position in a visual (e.g., virtualized) environment to a second position in the visual environment. At the first position, a stream is in front of the user in the visual environment, and at the second position, the stream is to the right of the user in the visual environment. As the user navigates from the first position to the second position, the sound output by the spatialized audio rendering system may change such that the user perceives sounds of the stream as coming from the user's right instead of coming from in front of the user.

To rendeEr or provide a listener with an accurate and immersive spatial audio experience, a high-quality and accurate spatial audio recording is often needed. For example, spatial audio recordings can be captured using multiple microphones that allow spatial information to be captured along with raw audio data, or otherwise determined from the raw audio data. Spatial information can include a direction of arrival (DOA) of particular sounds, arrival time differences (ATD) of a given sound at different microphone locations, arrival level differences of a given sound at different microphone locations, etc.

BRIEF SUMMARY

In some examples, systems and techniques are described for performing audio signal processing. For example, the systems and techniques can perform audio signal processing to generate restore or reconstructed spatial audio associated with a pair or set of microphones that includes at least one non-occluded microphone and at least one occluded microphone. According to at least one illustrative example, an apparatus to generate a spatial audio record is provided that includes a memory (e.g., configured to store data, such as audio data, one or more audio frames, etc.) and one or more processors (e.g., implemented in circuitry) coupled to the memory. The one or more processors are configured to and can: detect an occlusion for at least one audio frame of one or more audio frames associated with a spatial audio recording; and during the spatial audio recording, select between performing at least one of occluded spatial filtering of the one or more audio frames or non-occluded spatial filtering of the one or more audio frames based on detecting the occlusion for the at least one audio frame.

In another illustrative example, a method of performing spatial audio recording is provided, the method comprising: detecting an occlusion for at least one audio frame of one or more audio frames associated with a spatial audio recording; and during the spatial audio recording, selecting between performing at least one of occluded spatial filtering of the one or more audio frames or non-occluded spatial filtering of the one or more audio frames based on detecting the occlusion for the at least one audio frame.

In another example, a non-transitory computer-readable medium is provided that has stored thereon instructions that, when executed by one or more processors, cause the one or more processors to: detect an occlusion for at least one audio frame of one or more audio frames associated with a spatial audio recording; and during the spatial audio recording, select between performing at least one of occluded spatial filtering of the one or more audio frames or non-occluded spatial filtering of the one or more audio frames based on detecting the occlusion for the at least one audio frame.

In another example, an apparatus for spatial audio recording is provided. The apparatus includes: means for detecting an occlusion for at least one audio frame of one or more audio frames associated with a spatial audio recording; and means for, during the spatial audio recording, selecting between performing at least one of occluded spatial filtering of the one or more audio frames or non-occluded spatial filtering of the one or more audio frames based on detecting the occlusion for the at least one audio frame.

In another example, an apparatus for generating a spatial audio record is provided that includes a memory (e.g., configured to store data, such as audio data, one or more audio frames, etc.) and one or more processors (e.g., implemented in circuitry) coupled to the memory. The one or more processors are configured to and can: detect an occlusion of one or more microphones associated with at least one audio frame of one or more audio frames associated with the spatial audio record; and select, based on the detection of the occlusion, at least one of an occluded spatial filter for the one or more audio frames or a non-occluded spatial filter for the one or more audio frames.

In another illustrative example, a method of performing spatial audio recording is provided, the method comprising: detecting an occlusion of one or more microphones associated with at least one audio frame of one or more audio frames associated with the spatial audio record; and selecting, based on the detection of the occlusion, at least one of an occluded spatial filter for the one or more audio frames or a non-occluded spatial filter for the one or more audio frames.

In another example, a non-transitory computer-readable medium is provided that has stored thereon instructions that, when executed by one or more processors, cause the one or more processors to: detect an occlusion of one or more microphones associated with at least one audio frame of one or more audio frames associated with the spatial audio record; and select, based on the detection of the occlusion, at least one of an occluded spatial filter for the one or more audio frames or a non-occluded spatial filter for the one or more audio frames.

In another example, an apparatus for spatial audio recording is provided. The apparatus includes: means for detecting an occlusion of one or more microphones associated with at least one audio frame of one or more audio frames associated with the spatial audio record; and selecting, based on the detection of the occlusion, at least one of an occluded spatial filter for the one or more audio frames or a non-occluded spatial filter for the one or more audio frames.

In some aspects, one or more of the apparatuses described herein is, is part of, and/or includes a mobile device or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a camera, a personal computer, a laptop computer, a vehicle or a computing device or component of a vehicle, a server computer or server device, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 4A is a diagram illustrating an example spatial recording system that receives a multi-microphone input that includes non-occluded microphone signals, in accordance with some examples;

FIG. 4B is a diagram illustrating an example spatial recording system that receives a multi-microphone input that includes at least one occluded microphone signal, in accordance with some examples;

DETAILED DESCRIPTION

Figure 1:
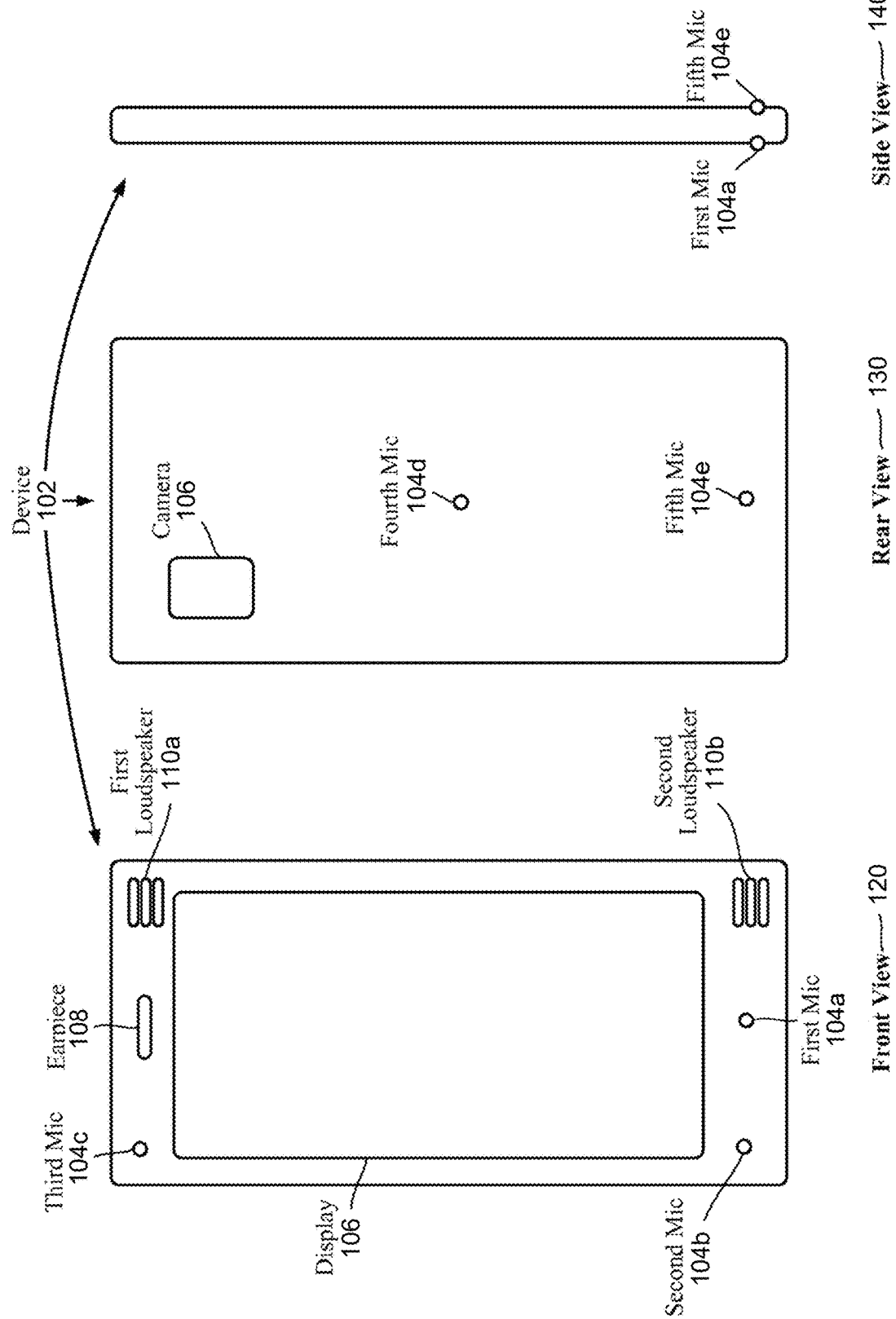
FIG. 1 is a diagram illustrating an example of a multi-microphone handset, in accordance with some examples.

Certain aspects and aspects of this disclosure are provided below. Some of these aspects and aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides exemplary aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Spatialized audio refers to the capture and reproduction of audio signals in a manner that preserves or simulates location information of audio sources in an audio scene (e.g., a 3D audio space). To illustrate, upon listening to playback of a spatial audio signal, a listener is able to perceive a relative location of various audio sources in the audio scene relative to each other and relative to the listener. One format for creating and playing back spatial audio signals is channel-based. In channel-based audio, loudspeaker feeds are adjusted to create a reproduction of the audio scene. Another format for spatial audio signals is object-based audio. In object-based audio, audio objects are used to create spatial audio signals. Each audio object is associated with 3D coordinates (and other metadata), and the audio objects are simulated at the playback side to create perception by a listener that a sound is originating from a particular location of an audio object. An audio scene may consist of several audio objects. Object-based audio is used in multiple systems, including video game systems. Higher order ambisonics (HOA) is another format for spatialized audio signals. HOA is used to capture, transmit and render spatial audio signals. HOA represents an entire sound field in a compact and accurate manner and aims to recreate the actual sound field of the capture location at the playback location (e.g., at an audio output device). HOA signals enable a listener to experience the same audio spatialization as the listener would experience at the actual scene. In each of the above formats (e.g., channel-based audio, object-based audio, and HOA based audio), multiple transducers (e.g., loudspeakers) are used for audio playback. If the audio playback output by headphones, additional processing (e.g., binauralization) is performed to generate audio signals that "trick" the listener's brain into thinking that the sound is actually coming from different points in the space rather than from the transducers in the headphones.

In one illustrative example, spatial audio (also referred to as "3D" or "360" audio) can refer to a variety of sound playback technologies that allow a listener to perceive sound all around themselves. For example, unlike stereo and surround sound audio formats (e.g., such as 5.1 or 7.1 surround sound), which portray audio in two dimensions and are tied to a specific multiple speaker setup, spatial audio can be used to portray audio in three dimensions (e.g., may introduce a height dimension) without a multiple speaker setup dependency.

In some cases, spatial audio technologies can cause a listener to perceive three-dimensional sound (e.g., spatial audio) based on emulating the acoustic interaction between real-world sound waves and a user's ears. For example, the interaction between sound waves and hearing anatomy, including the shape of the ears and the head, can be used to provide spatial audio to a listener. In some cases, the emulation may be based on one or more Human Related Transfer Functions (HRTFs) and/or various other spatial sound filters (e.g., also referred to as "spatial filters").

In some examples, to render or provide a listener with an accurate and immersive spatial audio experience, a high-quality and accurate spatial audio recording may be needed. For example, spatial audio recordings can be captured using multiple microphones that allow spatial information to be captured along with raw audio data, or otherwise determined from the raw audio data. Spatial information can include a direction of arrival (DOA) of particular sounds or sound signals, arrival time differences (ATD) of a given sound at different microphone locations, arrival level differences of a given sound at different microphone locations, etc.

Spatial audio recording can be performed using a mobile device that is equipped with multiple microphones (e.g., such as a smartphone or other multi-microphone device) or is otherwise able to provide a multi-microphone audio input to a spatial recording audio processor. In some cases, when a mobile device is used for spatial audio recording, one or more microphones may be occluded by the user's hands or fingers. Microphone occlusion can reduce the quality of the resulting spatial audio recording, corrupt or degrade the resulting spatial audio recording, and/or prevent a spatial audio recording from being generated. For example, a smartphone may include multiple microphones that are each recessed into the body of the smartphone (e.g., can include microphones that are seated in recessed openings included on an outer surface or body of the smartphone). When a user holds the smartphone and attempts to capture a spatial audio recording, the user's hands or fingers can block, occlude, or rub against one or more of the microphone openings. Such occlusion can result in audio quality degradation and/or a loss of the spatial audio image. There is a need for systems and techniques that can be used to generate spatial audio recordings from a multi-microphone (e.g., multichannel) audio input that includes audio captured by one or more occluded (e.g., partially occluded or fully occluded) microphones. There is also a need for systems and techniques that can be used to restore spatial audio signals associated with the one or more occluded microphones.

As described in more detail herein, systems, apparatuses, methods, and computer-readable media (collectively referred to as "systems and techniques") are described herein that can be used to generate spatial audio recordings (e.g., spatial audio outputs) from a multi-microphone input signal that includes one or more channels with audio degradation caused by occlusion of the corresponding microphone. For example, the systems and techniques can be used to restore spatial audio signals associated with the one or more occluded microphones. In some aspects, the systems and techniques may perform occlusion detection to identify one or more microphones of a microphone array (e.g., or otherwise included in a same multi-microphone device) that are currently experiencing an occlusion event. An occlusion event can be associated with a user's hands or fingers rubbing or blocking a microphone (e.g., rubbing or blocking an opening within which the microphone is located). In some aspects, a rubbing occlusion can be associated with a physical contact with the microphone or microphone opening that moves (e.g., changes) over time. A blocking occlusion can be associated with a static physical contact with the microphone or microphone opening in which at least a portion of the microphone or microphone opening is blocked and remains blocked over some period of time.

In some examples, the systems and techniques can determine an estimated direction of arrival (DOA) of one or more sound sources associated with or represented in a multichannel audio input. For example, the systems and techniques can determine one or more DOA estimates using the non-occluded channels of the multichannel audio input (e.g., using the audio channel signal information produced by microphones that were not identified as occluded during the occlusion detection described above).

In some examples, the systems and techniques can use occlusion information (e.g., determined based on the occlusion detection) and/or DOA information (e.g., determined based on the DOA estimation) to select one or more spatial filters for restoring a spatial audio output for occluded channels. For example, the systems and techniques can use the occlusion information and DOA information to select one or more spatial filters for reconstructing some (or all) of the occluded channels. In some aspects, the systems and techniques can use the occlusion information and DOA information to select one or more spatial filters for generating replacement channels that are different than the occluded channels. For example, the occlusion information may be indicative of the microphones and corresponding sound field locations that were expected by a spatial recording engine (e.g., such as spatial recording engine 430 illustrated in FIGS. 4A and 4B) but have become degraded or unavailable due to an occlusion event. The estimated DOA information may be indicative of the location(s) of one or more sound sources and can be used in combination with the occlusion information to determine portions or locations of the sound field in which the unavailable or degraded audio signal inputs are associated with lost sound source measurements (e.g., portions or locations of the sound field in which the occluded microphones are aligned with the DOA of the sound sources). As will be described in greater depth below, spatial audio output can be restored by selecting one or more spatial filters for generating beamformers that capture the portions of the sound field that were lost or degraded due to the occluded microphone(s).

Further details regarding the systems and techniques will be described with respect to the figures.

FIG. 1 illustrates three different views (e.g., a front view 120, a rear view 130, and a side view 140) of an example wireless communication device 120. For example, the front view 120 may correspond to a first side of the device 102 that includes a display 106. The first side may include a first microphone 104a, a second microphone 104b, a third microphone 104c, an earpiece 108, a first loudspeaker 110a, and a second loudspeaker 110b. The rear view 130 may correspond to a second side of the device 102 that is opposite to the first side. The second side may include a camera 106, a fourth microphone 104d, and a fifth microphone 104e. The side view 140 may correspond to a third side of the device 102 that connects the first side and the second side.

In one illustrative example, the wireless communication device 120 may also be referred to as a multi-microphone handset (e.g., a multi-microphone device). In some aspects, in addition to the handset implementation of multi-microphone device 102 that is depicted in FIG. 1, various other examples of audio sensing devices may additionally or alternatively be utilized to capture audio data using a multi-microphone array. For example, multi-microphone device 102 can be implemented using one or more of a portable computing device (e.g., laptop computers, notebook computers, ultra-portable computers, tablet computers, mobile Internet devices, smartphones, smart watches, wearables, etc.), audio- or video-playback devices (e.g., headphones, earbuds, speakers, etc.), audio- or video-conferencing devices, and/or display screens (e.g., computer monitors, television sets), etc. In some examples, multi-microphone device 102 can be implemented using, and/or can be included in, one or more of an XR device, a VR device, an AR device, a wearable device, a hearable device, smart glasses, a robotic device, etc.

In some cases, the microphones 104a-104e can be included in one or more configurable microphone array geometries (e.g., based on or associated with different sound source directions). In some aspects, different combinations (e.g., different pairs) of the microphones 104a-104e included in multi-microphone handset 120 can be selected or utilized to perform spatially selective audio recording in different sound source directions. For example, a first microphone pair may include first microphone 104a and second microphone 104b and may be associated with an axis extending in a left-right direction of a front face of the device 102 (e.g., from the perspective of front view 120). A given microphone may be included in multiple microphone pairs. For example, a second microphone pair may also include first microphone 104a along with fifth microphone 104e and may be associated with an axis extending in a front-back direction (e.g., orthogonal to the front face of the device and/or the perspective of front view 120). In some examples, the second microphone pair may be used to determine whether a sound source direction along the front-back axis (e.g., whether a user is speaking at the front face of the device 102 or the back face of the device 102). In some cases, a front-back pair of microphones (e.g., the second microphone pair of mics 104a and 104e) may be used to resolve an ambiguity between front and back directions that a left-right pair of microphones (e.g., the first microphone pair of mics 104a and 104b) may be unable to resolve on its own.

In some examples, when device 102 is used as a video camera (e.g., using camera 106 and one or more of the microphones 104a-e to capture audiovisual data), one or more front-back microphone pairs can be used to record audio in the front and back directions (e.g., by steering beams into and away from the camera 106, respectively). As mentioned previously, one front-back pair of microphones may include the first microphone 104a and the fifth microphone 104e. One or more different front-back pairs of microphones may also be utilized (e.g., first mic 104a and fourth mic 104d, second mic 104b and fourth mic 104d, second mic 104b and fifth mic 104e, third mic 104c and fourth mic 104d, third mic 104c and fifth mic 104e, etc.). In some aspects, the one or more front-back pairs of microphones may be used to record audio in front and back directions, with left and right direction preferences that may be manually or automatically determined.

In some aspects, the configurable microphone 104 a-e array geometry may be used to compress and transmit three-dimensional (3D) audio (e.g., also referred to as spatial audio). For example, different beamformer databanks may be determined for various combinations of microphones included in the plurality of microphones 104a-e of device 102, given a range of design methods (e.g., minimum variance distortionless response (MVDR), linearly constrained minimum variance (LCMV), phased arrays, etc.).

The multi-microphone device 102 can be used to determine a direction of arrival (DOA) of a source signal by measuring a difference (e.g., a phase difference) between microphone channels for each frequency bin to obtain an indication (or estimation) of direction, and averaging the direction indications over all frequency bins to determine whether the estimated direction is consistent over all bins. The range of frequency bins that may be available for tracking may be constrained by a spatial aliasing frequency for a corresponding microphone pair (e.g., the first microphone 104a and the second microphone 104b). The upper limit of the range may be defined as a frequency at which a wavelength of the source signal is twice the distance, d, between the microphones included in the microphone pair (e.g., microphones 104a, 104b).

Sources of sound may be tracked using available frequency bins up to Nyquist frequency and down to a lower frequency (e.g., by supporting use of a microphone pair having a larger inter-microphone distance). Rather than being limited to a single pair for tracking, such an approach may be implemented to select a best pair among all available pairs. Such an approach may be used to support source tracking even in a far-field scenario (e.g., up to a distance of three to five meters or more) and to provide a higher DOA resolution. In some cases, an exact 2-D representation of an active sound source can be obtained or otherwise determined.

The multi-microphone device 102 may be used to calculate a difference between a pair of channels of a multichannel input signal (e.g., obtained using one or more of the microphones 104a-e). For example, each channel of the multichannel signal may be based on a signal produced by a corresponding microphone (e.g., one of the microphones 104a-e). For each direction among a plurality K of candidate directions, a corresponding directional error can be determined based on the calculated difference. Based on the K directional errors, the multi-microphone device 102 may select a candidate direction.

A multichannel input signal (e.g., an input audio signal obtained using multiple ones of the microphones 104a-e) can be processed as a series of segments or "frames." In some cases, a segment length may range from about five or ten milliseconds to about forty or fifty milliseconds, and the segments may be overlapping (e.g., with adjacent segments overlapping by 25% or 50%) or non-overlapping. In one illustrative example, a multichannel signal can be divided into a series of non-overlapping segments or frames, each having a length of ten milliseconds. In another example, each frame may have a length of twenty milliseconds. A segment as processed by the multi-microphone device 102 may also be a segment (e.g., a "subframe") of a larger segment as processed by a different operation, or vice versa.

Examples of differences between the input channels captured by different ones of the microphones 104a-e can include a gain difference or ratio, a time difference of arrival, and/or a phase difference, etc. For example, the multi-microphone device 102 may calculate the difference between the channels of a pair of input signals (e.g., a first input signal associated with first microphone 104a and a second input signal associated with second microphone 104b) as a difference or ratio between corresponding gain values of the channels (e.g., a difference in magnitude or energy).

In some aspects, the multi-microphone device 102 may calculate measures of a gain of a segment of the multichannel signal in a time domain (e.g., for each subband of a plurality of subbands of the signal) and/or in a frequency domain (e.g., for each frequency component of a plurality of frequency components of the signal in a transform domain, such as a fast Fourier transform (FFT), discrete cosine transform (DCT), or modified DCT (MDCT) domain). Examples of such gain measures include, but are not limited to, one or more of the following: total magnitude (e.g., sum of absolute values of sample values), average magnitude (e.g., per sample), root mean square (RMS) amplitude, median magnitude, peak magnitude, peak energy, total energy (e.g., sum of squares of sample values), and average energy (e.g., per sample).

In order to obtain accurate results with a gain-difference technique, the responses of the different microphone channels included in the multichannel signal (e.g., a first input signal associated with first microphone 104a and a second input signal associated with second microphone 104b) may be calibrated relative to each other. The multi-microphone device 102 may apply a low-pass filter to the multichannel signal such that calculation of the gain measure is limited to an audio-frequency component of the multichannel signal.

In some aspects, the multi-microphone device 102 may calculate a difference between gains as a difference between corresponding gain measure values for each channel of the multichannel signal in a logarithmic domain (e.g., values in decibels) or, equivalently, as a ratio between the gain measure values in a linear domain. For a calibrated microphone pair (e.g., the first microphone 104a and the second microphone 104b), a gain difference of zero may be taken to indicate that the source is equidistant from each microphone (e.g., located in a broadside direction of the pair), a gain difference with a large positive value may be taken to indicate that the source is closer to one microphone (e.g., located in one endfire direction of the pair), and a gain difference with a large negative value may be taken to indicate that the source is closer to the other microphone (e.g., located in the other endfire direction of the pair).

In some examples, the multi-microphone device 102 may perform a cross-correlation on the input channels (e.g., a first input signal associated with first microphone 104a and a second input signal associated with second microphone 104b) to determine the difference, such as by calculating a time-difference-of-arrival based on a lag between channels of the multichannel signal.

In some cases, the multi-microphone device 102 may calculate the difference between the channels of a pair (e.g., a first input signal associated with first microphone 104a and a second input signal associated with second microphone 104b) as a difference between the phase of each channel (e.g., at a particular frequency component of the signal). In some aspects, such calculation may be performed for each among a plurality of frequency components.

For a signal received by a pair of microphones (e.g., the microphones 104a and 104b) directly from a point source in a particular direction of arrival (DOA) relative to an axis of the microphone pair (e.g., microphones 104a, 104b), a phase delay may differ for each frequency component and may also depend on a spacing between the microphones 104a and 104b. In some cases, the multi-microphone device 102 may calculate an observed value of the phase delay at a particular frequency component (or "bin") as an inverse tangent (also called the arctangent) of a ratio of an imaginary term of a complex FFT coefficient to a real term of the complex FFT coefficient.

Figure 2B:
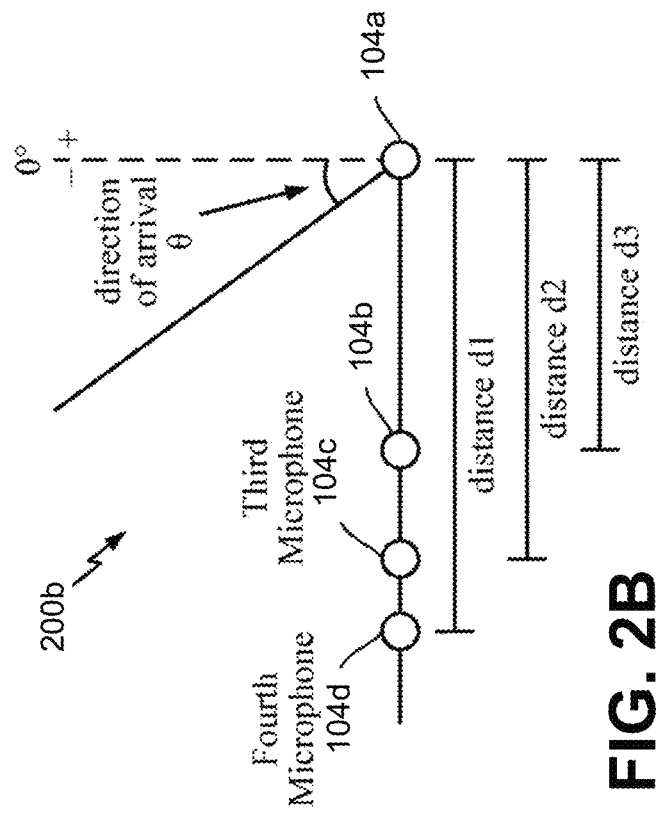
FIG. 2B is a diagram illustrating an example of microphone placement of multiple microphone pairs in a linear array, in accordance with some examples.
Figure 2A:
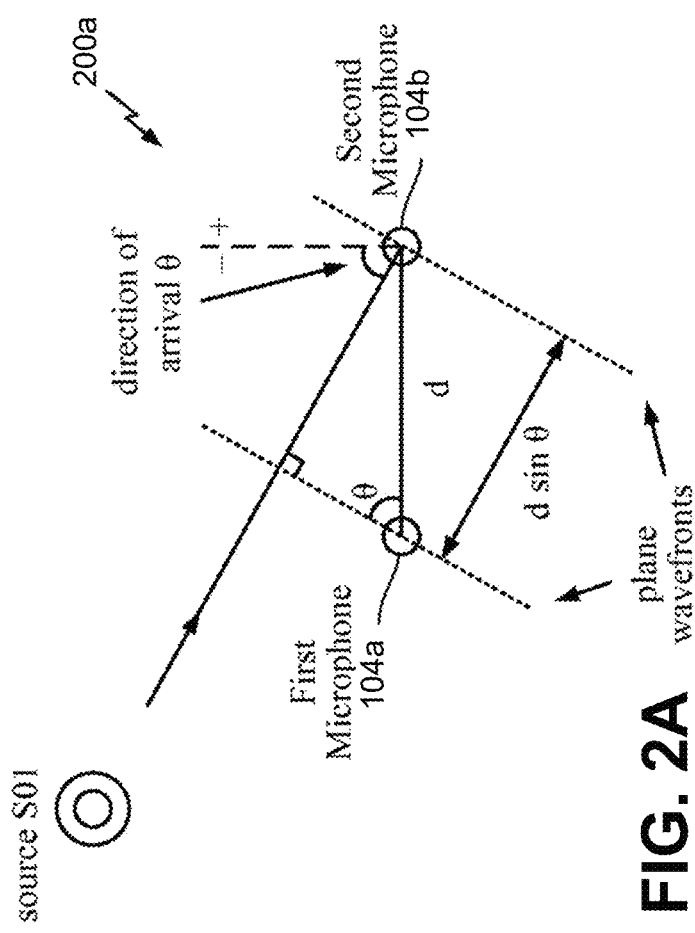
FIG. 2A is a diagram illustrating an example far-field model of plane wave propagation relative to a microphone pair, in accordance with some examples.

Referring to FIG. 2A, a diagram of a far-field model of plane wave propagation relative to a microphone pair is shown and generally designated 200a. In FIG. 2B, a diagram of an example of a microphone placement is shown and generally designated 200b. In some examples, the microphone placement 200b may correspond to the placement of the first, second, and third microphones 104a-c, respectively, and the fourth microphone 104d, illustrated in FIG. 1.

The multi-microphone device 102 may determine direction of arrival (DOA) information of the respective input signals corresponding to the microphones 104 a-c and 104d. For example, the far-field model 200a indicates that a phase delay value $\Delta\varphi_f$ for a source S01 for at least one microphone (e.g., the microphones 104a-b) at a particular frequency, f, may be related to a source DOA under a far-field (i.e., plane-wave) assumption as:

$$\Delta\varphi_f = 2\pi f \frac{d\sin\theta}{c}$$

Here, d denotes a distance between the microphones 104a and 104b (e.g., in meters), θ denotes the angle of arrival (e.g., in radians) relative to a direction that is orthogonal to an array axis, f denotes frequency (e.g., in hertz (Hz)), and c denotes the speed of sound (e.g., in m/s). The DOA estimation principles described herein may be extended to multiple microphone pairs in a linear array (e.g., as shown in FIG. 2B). For the case of a single point source with no reverberation, a ratio of phase delay to frequency $\Delta\varphi_f$ will have the same value:

$$2\pi f \frac{d\sin\theta}{c}$$

over all frequencies. The DOA, θ, relative to a microphone pair (e.g., the microphones 104a and 104b) is a one-dimensional measurement that defines a surface of a cone in space (e.g., such that an axis of the cone is the axis of the array).

In some examples, an input audio signal (e.g., a speech signal) may be sparse in a time-frequency domain. If sources of the input signals included in a multichannel input (e.g., produced using the multiple microphones 104a-e of device 102) are disjoint in the frequency domain, then the multi-microphone device 102 may track two sources at the same time. If the sources are disjoint in the time domain, then the multi-microphone device 102 may track two sources at the same frequency. A microphone array of the device 102 may include a quantity of microphones that is at least equal to a quantity of different source directions to be distinguished at any one time. The microphones (e.g., the microphones 104a-e illustrated in FIG. 1) may be omnidirectional (e.g., for a cellular telephone or a dedicated conferencing device) or directional (e.g., for a device such as a set-top box).

In some aspects, the multi-microphone device 102 may calculate a DOA estimate for a frame of a received multi-channel input signal (e.g., produced using one or more, or all, of the microphones 104a-e of device 102). The multi-microphone device 102 may calculate, at each frequency bin, an error for each candidate angle with respect to an observed angle, which is indicated by a phase delay. A target angle at that frequency bin may be the candidate having a minimum (or least) error. In one example, the error may be summed across the frequency bins to obtain a measure of likelihood for the candidate. In another example, one or more of the most frequently occurring target DOA candidates across all frequency bins may be identified as the DOA estimate (or estimates) for a given frame.

The multi-microphone device 102 may obtain substantially instantaneous tracking results (e.g., with a delay of less than one frame). The delay may be dependent on an FFT size and a degree of overlap. For example, for a 512-point FFT with a 50% overlap and a sampling frequency of 16 kilohertz (kHz), a resulting 256-sample delay may correspond to sixteen milliseconds. The multi-microphone device 102 may support differentiation of source directions up to a source-array distance of two to three meters, or up to five meters, etc.

The error may also be considered as a variance (e.g., the degree to which the individual errors deviate from an expected value). Conversion of the time-domain received signal into the frequency domain (e.g., by applying an FFT) may have an effect of averaging a spectrum in each bin. This averaging may be more effective if the multi-microphone device 102 uses a subband representation (e.g., mel scale or Bark scale). In some aspects, the multi-microphone device 102 may perform time-domain smoothing on the DOA estimates (e.g., by applying a recursive smoother, such as a first-order infinite-impulse-response filter). In some examples, the multi-microphone device 102 may reduce a computational complexity of the error calculation operation (e.g., by using a search strategy, such as a binary tree, and/or applying known information, such as DOA candidate selections from one or more previous frames).

While directional information may be measured in terms of phase delay, the multi-microphone device 102 may obtain a result that indicates source DOA. The multi-microphone device 102 may calculate a directional error at frequency f, for each DOA candidate of an inventory of K DOA candidates, in terms of DOA rather than in terms of phase delay.

Figure 3:
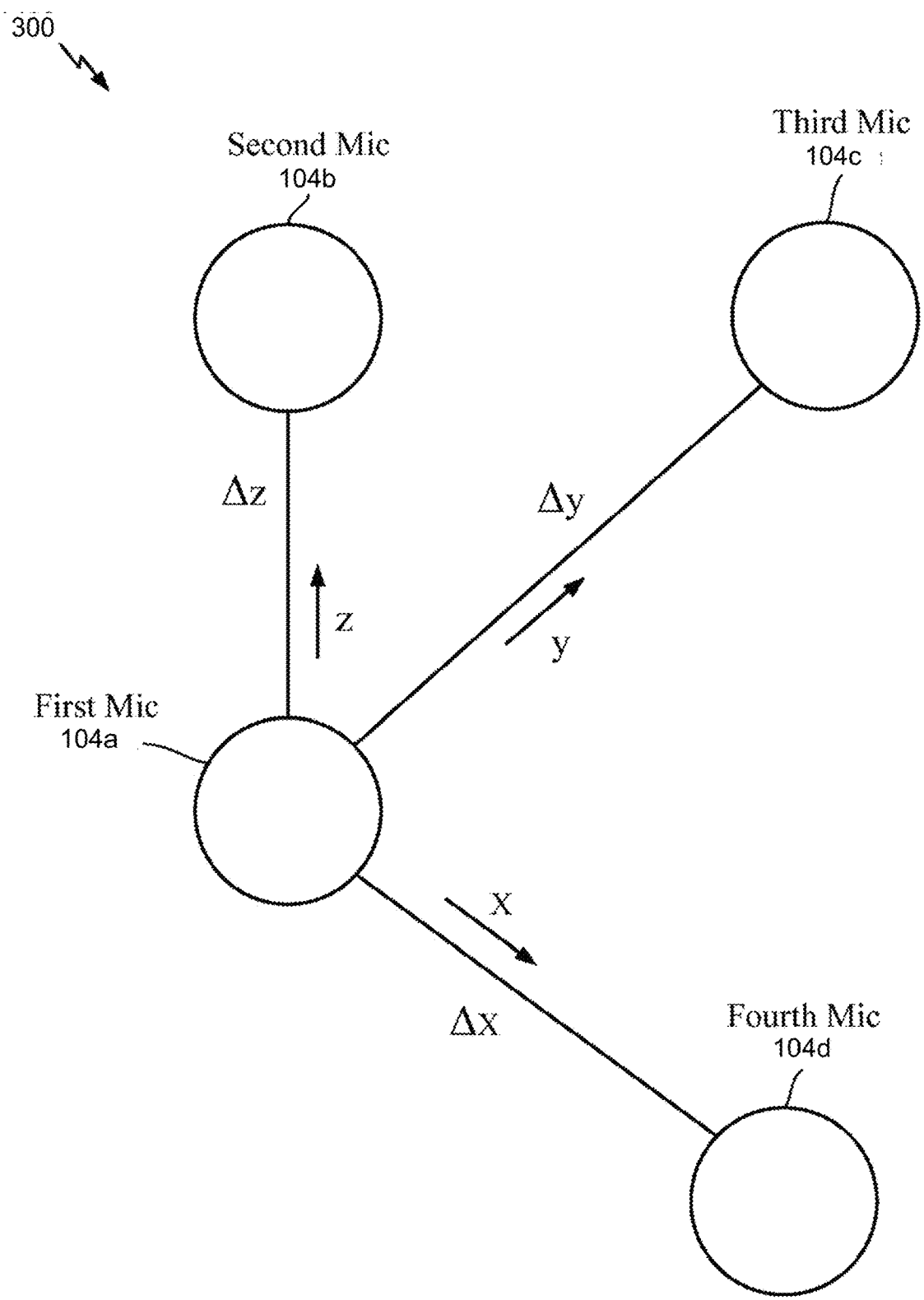
FIG. 3 is a diagram illustrating an omnidirectional and first-order capturing for spatial coding using a four-microphone array, in accordance with some examples.

Referring to FIG. 3, an example arrangement of microphones is shown and generally designated 300. In one illustrative example, the example arrangement of microphones 300 can be associated with an omnidirectional and first-order capturing for spatial coding using a four-microphone array, as will be described in greater depth below. Using the microphone arrangement 300, the multi-microphone device 102 may generate output audio signals from the input signals corresponding to the microphones 104a-d. For example, the multi-microphone device 102 may use the microphone arrangement 300 to approximate a first order capturing for spatial coding using a four-microphone setup (e.g., using the microphones 104a-d). Examples of spatial audio encoding methods that may be supported with a multi-microphone array as described herein may also include methods that may originally be intended for use with a particular microphone, such as the Ambisonic B format or a higher-order Ambisonic format. The processed multichannel outputs of an Ambisonic encoding scheme, for example, may include a three-dimensional Taylor expansion on a measuring point, which can be approximated at least up to first-order using a three-dimensionally located microphone array (e.g., corresponding to the microphone arrangement 300). When a greater quantity of microphones is included in or otherwise associated with multi-microphone device 102, an approximation order may be increased.

As illustrated, in some examples, the second microphone 104b may be separated from first microphone 104a by a distance Δz in the z-direction and the third microphone 104c may be separated from the first microphone 104a by a distance Δy in the y-direction. The fourth microphone 104d may be separated from the first microphone 104a by a distance Δx in the x-direction. In some aspects, the audio signals captured using the microphones 104a-e may be processed or/and filtered to obtain DOAs of audio frames. In one illustrative example, the audio signals captured using the microphones 104a-e may be "shaped" using one or more beamformers. The shaped audio signals may be played back in a surround sound system, headphones, or other audio playback device to generate an immersive sound experience (e.g., a spatialized audio experience).

In some examples, a multi-microphone device (e.g., such as multi-microphone device 102 illustrated in FIG. 1) can be used to capture or otherwise produce a multichannel audio signal. A multichannel audio signal can include a plurality of different audio signals (e.g., different audio channels captured by different microphones and/or combinations of microphones) and can be used to generate a spatial audio output, as will be described in greater depth below. FIG. 4A is a diagram illustrating an example spatial audio recording system 400a that can generate a spatial audio output based on receiving as input a multichannel (e.g., multi-microphone) audio signal that includes non-occluded microphone signals. For example, the spatial audio recording system 400a can receive a multi-microphone input signal 410a that is captured by a multi-microphone device 402. In some aspects, the multi-microphone device 402 may be the same as or similar to the multi-microphone device 102 illustrated in FIG. 1 and described previously above.

As illustrated, the example spatial audio recording system 400a can include a pre-processing engine 420 (e.g., which receives as input multi-microphone input signal 410a), a spatial recording engine 430 (e.g., which generates a spatial output signal 435a), and a post-processing engine 440. In some aspects, the multi-microphone input signal 410a provided to the pre-processing engine 420 can include one audio channel for each microphone of the device 402 that was used to capture the multi-microphone input signal 410a. For example, the multi-microphone input signal 410a can be a stereo signal that includes a left channel and a right channel that are each captured by a respective microphone included in device 402. In another example, the multi-microphone input signal 410a can include three or more channels (e.g., a left channel, a center channel, and a right channel) that are each captured by a respective microphone included in device 402.

In one illustrative example, one or more (or all) of the pre-processing engine 420, the spatial recording engine 430, and/or the post-processing engine 440 can be included in or implemented by device 402 (e.g., the spatial audio recording system 400a can be implemented locally on device 402). In some examples, one or more (or all) of the pre-processing engine 420, the spatial recording engine 430, and/or the post-processing engine 440 can be implemented remote from device 402 (e.g., using one or more remote servers, cloud compute platforms, etc.).

In some aspects, pre-processing engine 420 can implement one or more audio pre-processing functions or operations. For example, pre-processing engine 420 can perform the one or more audio pre-processing functions or operations for some (or all) of the respective audio channels included in the multi-microphone input 410a. In some cases, pre-processing engine 420 can perform audio pre-processing operations that may include, but are not limited to, gain adjustments (e.g., gain boost or gain decrease), noise removal, noise suppression, etc. In some aspects, the one or more audio pre-processing operations performed by pre-processing engine 420 may be linear processing operations (e.g., pre-processing engine 420 may not perform non-linear processing operations). In some cases, the one or more audio pre-processing operations can be performed (e.g., by pre-processing engine 420) without modifying or changing the envelope of the respective audio signal associated with each channel of the multi-channel microphone input 410a.

After pre-processing is performed for the multi-microphone input 410a (e.g., in a pre-processing stage associated with pre-processing engine 420), the pre-processed audio channels of the multi-microphone input 410a can be provided as input to spatial recording engine 430. Spatial recording engine 430 can generate a spatial audio output 435a based on the pre-processed audio channel signals provided as output by the pre-processing engine 420. In some examples, pre-processing may not be performed for the multi-microphone input 410a (e.g., the inputs and outputs of pre-processing engine 420 can be the same, or pre-processing engine 420 can be removed from the example spatial audio recording system 400a), in which case the spatial recording engine 430 can generate the spatial audio output 435a using the raw audio channel signals included in multi-microphone input 410a.

In some cases, the spatial audio output 435a can be provided to post-processing engine 440, which generates as output a final spatial audio stream (e.g., also referred to as the spatial audio recording generated by the example spatial audio recording system 400a). The spatial audio stream can be generated based on applying or otherwise performing one or more post-processing operations for some (or all) of the respective audio channels included in the spatial audio output 435a. In some aspects, the quantity of channels included in the multi-microphone input 410a can be different from the quantity of channels included in the spatial audio output 435a. For example, when the device 402 includes a plurality of microphones and the multi-microphone input 410a includes a corresponding plurality of audio channels, the spatial audio output 435a can include a greater quantity of channels than the multi-microphone input 410a or the spatial audio output 435a can include a lesser quantity of channels than the multi-microphone input 410a. In some aspects, the quantity of channels included in the spatial audio output 435a may be the same as the quantity of beamformers utilized by the spatial recording engine 430.

In some cases, the spatial audio output 435a can be generated by spatial recording engine 430 using one or more pre-determined spatial filters that correspond to an expected configuration of the microphones used to capture the raw multi-mic input 410a (e.g., an expected configuration of the microphones included on the multi-microphone device 402). For example, spatial recording engine 430 can include one or more pre-determined two-channel spatial filters that correspond to a two-channel (e.g., stereo) configuration of a first and second microphone of device 402. The pre-determined two-channel spatial filters can be used to generate spatial audio (e.g., spatial audio output 435a) from a stereo input 410a captured using first and second microphones of device 402.

Spatial recording engine 430 may additionally, or alternatively, include one or more pre-determined multi-channel spatial filters (e.g., three-channel spatial filters, four-channel spatial filters, etc.) for generating spatial audio from three-channel or greater input 410a that is captured using a corresponding three or greater microphones of device 402. In some aspects, when device 402 includes three or more microphones and/or multi-microphone input 410a includes three or more channels, the spatial recording engine 430 can utilize beamforming to generate the spatial audio output 435a. Each beamformer can be determined based on assigning pre-determined beamformer weight values to the audio channel information associated with a subset or selection of microphones included in the set of three or more microphones represented in the multichannel input 410a.

For example, spatial recording engine 430 can perform beamforming based on determining one or more direction of arrival (DOA) estimates. In one illustrative example, the spatial recording engine 430 can include a DOA estimator (not shown) that performs various operations on time-matched input data (e.g., time-matched audio channel data included in the multichannel input 410a) to estimate DOAs of the incident sound within various frequency bands. The DOA estimator may utilize various techniques to estimate the DOA of the sounds from one or more sound sources incident on a microphone array of device 402 (e.g., incident on the plurality of microphones of device 402). For example, a DOA estimator may estimate the spatial correlation matrix of the input signals from a subset of the microphones included in a microphone array of device 402 and may perform an Eigen analysis of the spatial correlation matrix to obtain a set of DOA estimates. These DOA estimates may then be used to assign weights to each of the subset of microphones used in the DOA estimation. For example, various beamforming algorithms may be used to assign weights to the each of the subset of microphones used in the DOA estimation based on the DOA estimate. In some aspects, the beamforming algorithm selected or otherwise utilized by spatial recording engine 430 may be based on the geometry of the microphone array of device 402. Once the weights are assigned, a corresponding beamformer can be determined based at least in part on a weighted summation of each of the sound signals used in the DOA estimation.

In some aspects, the spatial audio output 435a can be generated by spatial recording engine 430 using pre-determined spatial filters and/or pre-determined beamformers that depend upon the multi-microphone input signal 410a including an expected quantity of audio channels each associated with a different microphone of device 402 (e.g., based on the spatial filters and/or beamformers being pre-determined for an expected quantity of microphones and a geometry or arrangement of the microphones as provided on device 402).

In some cases, if one or more of the expected audio channels are not included in the multi-microphone input 410a (e.g., based on a blocking occlusion of the corresponding microphone or microphone opening on device 402) and/or if one or more of the expected audio channels are included in the multi-microphone input 410a but exhibit audio quality degradation (e.g., based on rubbing or partial occlusion of the corresponding microphone or microphone opening on device 402), spatial recording engine 430 may be unable to generate the spatial audio output 435a.

For example, as illustrated in FIG. 4B, if one or more expected audio channels associated with a multichannel input 410b are occluded, such that the expected audio channel is not present or is degraded, the spatial recording engine 430 may generate a corrupted spatial output 435b. In some cases, the corrupted spatial output 435b may be associated with a loss of spatial imaging (e.g., wherein the corrupted spatial output 435b is corrupted to an extent that a listener would not perceive the corrupted spatial output 435b as providing a spatial audio experience).

As mentioned previously, when a mobile device is used for spatial audio recording, one or more microphones may be occluded by the user's hands or fingers. Microphone occlusion can reduce the quality of the resulting spatial audio recording, corrupt or degrade the resulting spatial audio recording, and/or prevent a spatial audio recording from being generated. For example, a smartphone may include multiple microphones that are each recessed into the body of the smartphone (e.g., can include microphones that are seated in recessed openings included on an outer surface or body of the smartphone). When a user holds the smartphone and attempts to capture a spatial audio recording, the user's hands or fingers can block or rub against one or more of the microphone openings. In some aspects, blocking of a microphone and rubbing of a microphone may both be referred to as "occlusion" of the microphone. In some cases, the occlusion of a microphone may be a partial occlusion or a full occlusion. There is a need for systems and techniques that mitigate the audio quality degradation and/or loss of spatial audio image that is associated with such microphone occlusions.

As described in more detail below, systems and techniques are described herein that can be used to generate spatial audio recordings (e.g., spatial audio outputs) from a multi-microphone input signal that includes one or more channels with audio degradation caused by occlusion of the corresponding microphone. As used herein, the terms "record" and "recording" are used interchangeably (e.g., "spatial audio record" and "spatial audio recording" are used interchangeably). In some examples, the systems and techniques can be used to restore spatial audio signals associated with the one or more occluded microphones. In some aspects, the systems and techniques may perform occlusion detection to identify one or more microphones of a microphone array (e.g., or otherwise included in a same multi-microphone device) that are currently experiencing an occlusion event. An occlusion event can be associated with a user's hands or fingers rubbing or blocking a microphone (e.g., rubbing or blocking an opening within which the microphone is located). In some aspects, a rubbing occlusion can be associated with a physical contact with the microphone or microphone opening that moves (e.g., changes) over time. A blocking occlusion can be associated with a static physical contact with the microphone or microphone opening in which at least a portion of the microphone or microphone opening is blocked and remains blocked over some period of time.

In some examples, the systems and techniques can determine an estimated direction of arrival (DOA) of one or more sound sources associated with or represented in a multichannel audio input. For example, the systems and techniques can determine one or more DOA estimates using the non-occluded channels of the multichannel audio input (e.g., using the audio channel signal information produced by microphones that were not identified as occluded during the occlusion detection described above).

In some examples, the systems and techniques can use occlusion information (e.g., determined based on the occlusion detection) and/or DOA information (e.g., determined based on the DOA estimation) to select one or more spatial filters for restoring a spatial audio output for occluded channels. For example, the systems and techniques can use the occlusion information and DOA information to select one or more spatial filters for reconstructing some (or all) of the occluded channels. In some aspects, the systems and techniques can use the occlusion information and DOA information to select one or more spatial filters for generating replacement channels that are different than the occluded channels. For example, the occlusion information may be indicative of the microphones and corresponding sound field locations that were expected by a spatial recording engine (e.g., such as spatial recording engine 430 illustrated in FIGS. 4A and 4B) but have become degraded or unavailable due to an occlusion event. The estimated DOA information may be indicative of the location(s) of one or more sound sources, and can be used in combination with the occlusion information to determine portions or locations of the sound field in which the unavailable or degraded audio signal inputs are associated with lost sound source measurements (e.g., portions or locations of the sound field in which the occluded microphones are aligned with the DOA of the sound sources). As will be described in greater depth below, spatial audio output can be restored by selecting one or more spatial filters for generating beamformers that capture the portions of the sound field that were lost or degraded due to the occluded microphone(s).

In some aspects, the spatial filter selection (e.g., spatial construction selection) for restoring spatial audio output for a multichannel input signal that includes at least one occluded channel can be performed based at least in part on a quantity of microphones used to capture the multichannel input signal (e.g., a quantity of microphones associated with the expected, non-occluded input signal and/or a quantity of channels expected in the multichannel input signal). In one illustrative example, the systems and techniques can restore a spatial audio output for a stereo (e.g., two-channel) input that includes one occluded channel and one non-occluded channel. In some aspects, the systems and techniques can determine and use arrival time difference (ATD) information and arrival level difference (ALD) information to reconstruct a spatial (e.g., stereo) image for the duration of the occlusion event. For example, the ATD and ALD information can be used to reconstruct the occluded channel audio signal using the non-occluded channel audio signal.

In another illustrative example, the systems and techniques can restore a spatial audio output for a multichannel input signal that includes three or more channels and in which at least one channel is occluded. For example, based on performing occlusion detection to identify the one or more microphones (e.g., input channels) that are occluded, the systems and techniques can restore the occluded microphone audio channel information by using the non-occluded microphone audio channel information to construct one or more beamformers (e.g., wherein the one or more beamformers reconstruct the occluded channel(s)).

Figure 5:
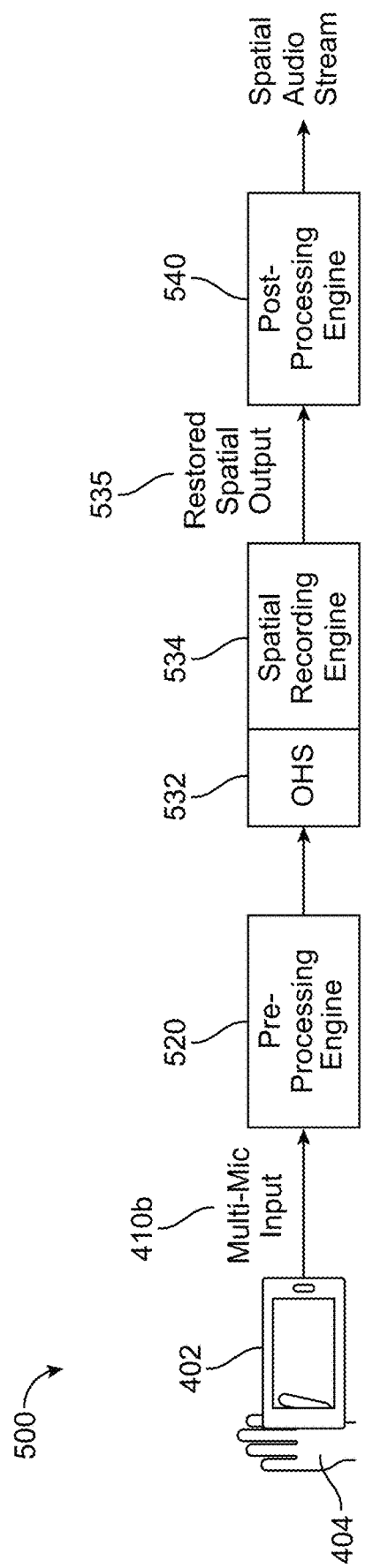
FIG. 5 is a diagram illustrating an example spatial recording system with occlusion handling, in accordance with some examples.

For example, FIG. 5 is a diagram illustrating an example spatial audio recording system 500 that can perform occlusion handling for spatial audio recording. In some aspects, the example spatial audio recording system 500 can include the same multi-microphone input device 402 illustrated in FIGS. 4A and 4B and/or the same multi-microphone input 410b that includes at least one occluded channel as is illustrated in FIG. 4B. In some aspects, the example spatial audio recording system 500 can include a pre-processing engine 520 that is the same as or similar to the pre-processing engine 420 illustrated in FIGS. 4A and 4B and/or can include a post-processing engine 540 that is the same as or similar to the post-processing engine 440 illustrated in FIGS. 4A and 4B.

In one illustrative example, spatial recording can be performed using an occlusion handling engine 532 and a spatial recording engine 534. In some aspects, the occlusion handling engine 532 may also be referred to as an occlusion handling system (OHS). As will be described in greater depth below, the OHS 532 can be used to perform occlusion detection to identify one or more microphones of a microphone array (e.g., or otherwise included in a same multi-microphone device) that are occluded for a current or given frame of input audio data. OHS 532 can additionally be used to perform DOA estimation and spatial filter selection, as will also be described in greater depth below. Spatial recording engine 534 can receive from OHS 532 occlusion information corresponding to one or more occluded microphone channels included in the multi-microphone input 410b and may utilize the occlusion information to generate a restored spatial audio output 535.

Figure 6:
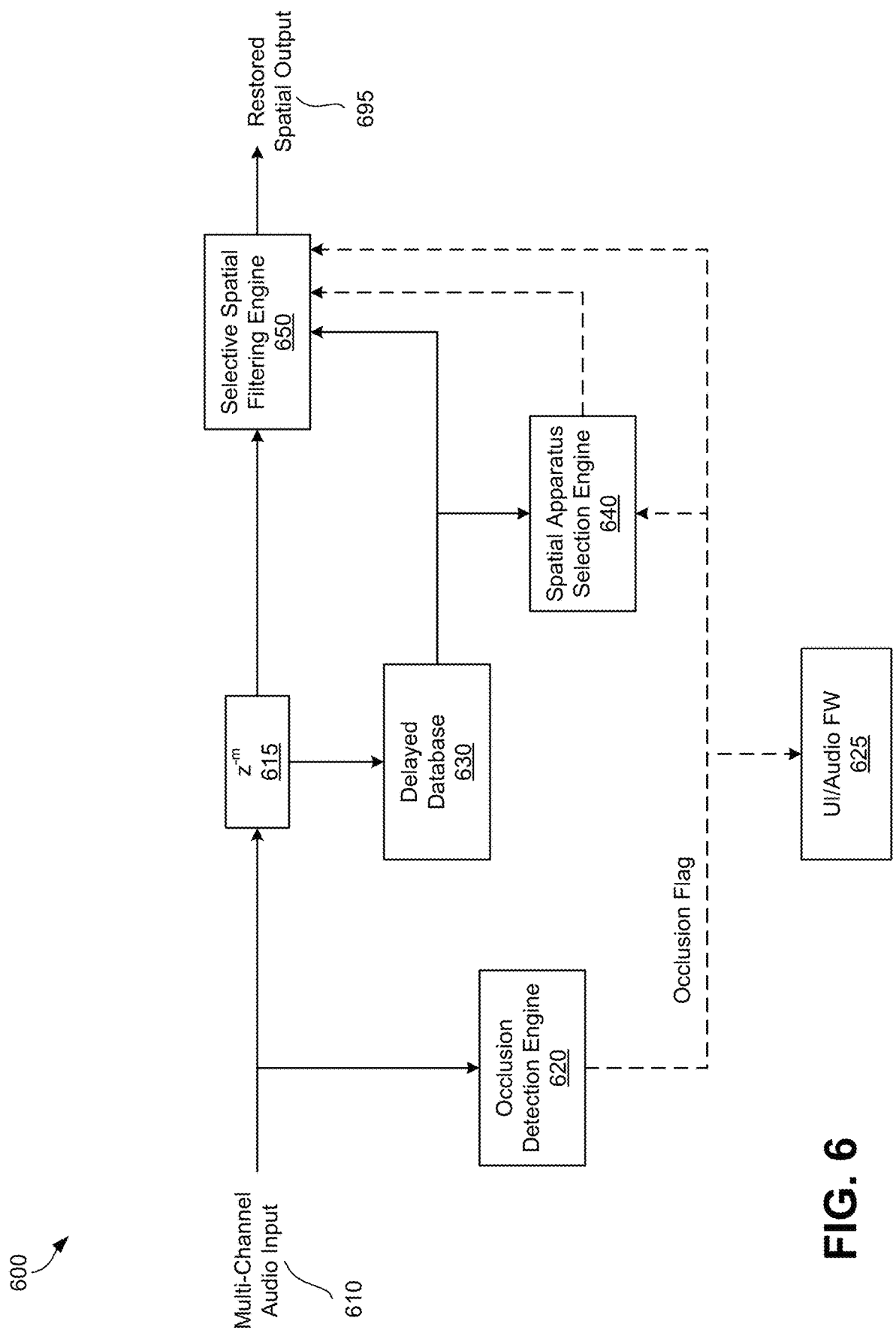
FIG. 6 is a diagram of an example spatial recording occlusion handling system, in accordance with some examples.

FIG. 6 is a diagram illustrating an example spatial recording occlusion handling system 600. In one some examples, spatial recording occlusion handling system 600 can be used to implement the OHS 532 and the spatial recording engine 534 illustrated in FIG. 5. Spatial recording occlusion handling system 600 can receive as input a multi-channel audio input 610, which may include one or more occluded audio channels. Spatial recording occlusion handling system 600 can generate a restored spatial output 695 based on the non-occluded audio channels included in the multi-channel audio input 610. In some cases, where the multi-channel audio input 610 does not include any occluded audio channels, the spatial recording occlusion handling system 600 can generate a spatial output in a manner the same as or similar to that described above with respect to the example spatial recording system 400.

As illustrated, the spatial recording occlusion handling system 600 may include an occlusion detection engine 620, a delayed audio database 630, a spatial apparatus selection engine 640 (e.g., also referred to as a spatial filter selection engine), and a selective spatial filtering engine 650, each of which are described in greater detail below.

In some examples, a user interface (UI)/audio framework 625 can be external to (e.g., not included in) the spatial recording occlusion handling system 600. The UI/audio framework 625 can receive an occlusion flag generated by occlusion detection engine 620 for a given frame (e.g., the current frame) of multichannel audio input 610. For example, in some aspects an occlusion warning or other UI element may be generated and displayed to a user of a corresponding multi-microphone device (e.g., the multi-microphone device for which the occlusion flag is generated and/or received by UI/audio framework 625). In some cases, the occlusion warning generated based on UI/audio framework 625 receiving the occlusion flag can be a visual notification or warning displayed on a display of the corresponding multi-microphone device. For example, the occlusion warning can be used to inform the user(s) of the corresponding multi-microphone device that one or more microphones of the device are currently being occluded. Based on receiving the occlusion warning generated using UI/audio framework 625, the user may be prompted to relocate his or her finger(s) to avoid continued microphone occlusion.

In one illustrative example, the multichannel audio input 610 can include frames of audio signal data for each respective audio channel (e.g., wherein each respective audio channel of multichannel audio input 610 is captured by a corresponding microphone associated with the same device and/or spatial recording). Audio frames may also be referred to as audio samples and can be the smallest discrete unit of data that is captured by a microphone. For example, if a given microphone has a sample rate of 48,000 samples/sec (e.g., 48 kHz), one second of captured audio will include 48,000 audio frames. Audio frames can include amplitude (e.g., loudness) information at a particular point in time, with audio playback being performed by playing the consecutive audio frames in sequential order. Multichannel audio, such as the multichannel audio input 610, can include one audio frame per channel for each given point in time in which sampling was performed. For example, one second of mono audio sampled at 48 kHz can include 48,000 audio frames, one second of stereo audio sampled at 48 kHz can include 96,000 audio samples, one second of three-channel audio sampled at 48 kHz can include 144,000 audio frames, etc.

In some aspects, a current audio frame (e.g., the most recently received frame) of the multichannel audio input 610 can be provided to the occlusion detection engine 620.

Occlusion detection engine 620 can analyze the current audio frame to determine whether occlusion (e.g., rubbing or blocking) has occurred for one or more of the microphones/channels represented in the multichannel audio input 610. For example, occlusion detection engine 620 can generate or otherwise set an occlusion flag indicative of whether occlusion was detected in the current audio frame for each channel included in the multichannel audio input 610, as will be described in greater depth below with respect to FIG. 7.

The current frame of multichannel audio input 610 can additionally be provided to a delay filter 615 that is coupled to the delayed audio database 630. The delayed audio database 630 can store one or more delayed audio signals that are based on the multichannel audio input 610. For example, delayed audio database 630 can generate and store a delayed version of each audio channel included in the multichannel audio input 610. In some aspects, the delayed audio database 630 can generate the delayed versions of each audio channel using a delay filter 615 (e.g., shown as delay filter $z^{-m}$ 615). For example, the multichannel audio input 610 received at the delay filter $z^{-m}$ 615 can be delayed by m samples (e.g., m frames) before being written to the delayed audio database 630. In one illustrative example, occlusion detection is performed by occlusion detection engine 620 using the current frame of audio input 610, while spatial filter selection is performed by spatial apparatus selection engine 640 using one or more delayed frames of audio input 610 (e.g., wherein the delayed frames are delayed relative to the current frame based on the delay filter $z^{-m}$ 615). In some aspects, selective spatial filtering engine 650 can receive delay information from the delay filter 615. For example, the selective spatial filtering engine can receive the value of the delay m (e.g., the number of samples, m, by which the multichannel audio input 610 received at delay filter 615 is delayed before being written to the delayed audio database 630). In one illustrative example, the delayed audio database 630 can be used to provide a time buffer between detecting the onset of an occlusion event and the occlusion event being represented in or associated with the spatial output 695. For example, if an occlusion event is detected for a given set of audio frames at time $t_0$, the same given set of audio frames is not used to generate the spatial output 695 until the delayed time $t_d = t_0 + m$ (e.g., the given set of audio frames may be obtained and an occlusion detected at $t_0$, but these audio frames are not processed by selective spatial filtering engine 650 or read from delayed audio database 620 until the delayed time $t_d$, which is m frames after $t_0$). In some cases, selective spatial filtering engine 650 can begin crossfading from non-occluded spatial filtering to occluded spatial filtering at time $t_0$, such that crossfading is completed by the delayed time $t_0$ (e.g., $t_0 + m$) at which selective spatial filtering engine 650 receives the delayed version of the first audio frame for which the occlusion was detected.

Figure 7:
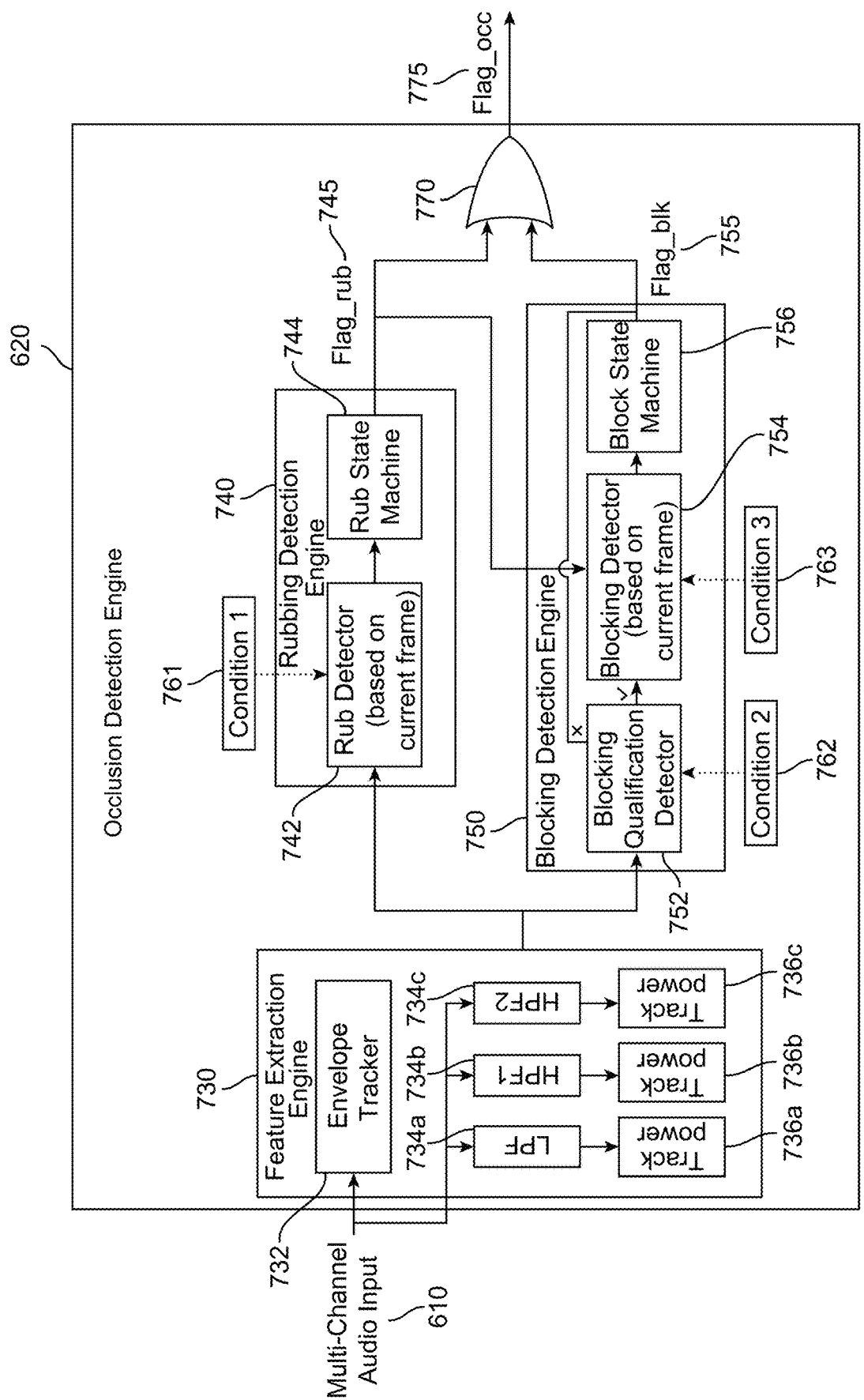
FIG. 7 is a diagram of an example occlusion detection engine, in accordance with some examples.

FIG. 7 is a diagram illustrating an example architecture of occlusion detection engine 620. In one illustrative example, the current frame of the multichannel audio input 610 can be provided to a feature extraction engine 730, which can generate one or more audio features for performing the occlusion detection. In some aspects, feature extraction engine 730 can receive the current frame for each channel included in multichannel audio input 610. For example, audio features can be extracted or generated for each audio channel/microphone and an occlusion flag 775 can be determined for each audio channel/microphone based on analyzing the extracted audio features.

In some examples, feature extraction engine 730 can include an envelope tracker 732 for tracking an envelope value associated with each audio channel. The tracked envelope value can be utilized as an audio feature for subsequent downstream processes of at least occlusion detection engine 620.

In addition to envelope tracker 732, the current frame for each audio channel included in input 610 can be further provided to a series of filter banks for tracking power. For example, feature extraction engine 730 can include a low-pass filter (LPF) 734a, a first high-pass filter (HPF1) 734b, and a second high-pass filter (HPF2) 734c, wherein each filter receives as input the current frame for each audio channel. In some aspects, HPF1 734b can perform high pass filtering using a different cutoff frequency than HPF2 734c. For example, the HPF1 cutoff frequency can be higher than the HPF2 cutoff frequency or the HPF1 cutoff frequency can be lower than the HPF2 cutoff frequency. In one illustrative example, the HPF1 cutoff frequency can be lower than the HPF2 cutoff frequency (e.g., HPF2 cutoff frequency>HPF1 cutoff frequency) based on the systems and techniques using HPF2 734c to detect windy conditions and/or mitigate false alarms caused by wind noise or wind turbulence captured at one or more microphones (e.g., as will be described in greater depth below).

Each of the filters 734a-c can be associated with a corresponding power tracker 736a-c. For example, a first power tracker 736a can generate an LPF power value for each audio channel included in the low pass filtered output of LPF 734a. A second power tracker 736b can generate an HPF1 power value for each audio channel included in the first high pass filtered output of HPF1 734b, and a third power tracker 736c can generate an HPF2 power value for each audio channel included in the second high pass filtered output of HPF2 734c.

As illustrated, for each audio channel included in the multichannel input 610, feature extraction engine 730 can generate an envelope value feature (e.g., using envelope tracker 732) and can generate three power values (e.g., using the filters 734a-c and the corresponding power trackers 736a-c). For example, if multichannel input 610 is a stereo signal (e.g., includes two channels), feature extraction engine 730 can generate a total of eight features, four for each of the two channels. Similarly, if multichannel input 610 is a three-channel signal, feature extraction engine 730 can generate 12 features, four for each of the three channels. In some aspects, the generated features can be instantaneous values (e.g., the value determined for the current audio frame of each channel), differential values (e.g., the current frame value compared to one or more previous frame value(s), for each channel), short-term average values, long-term average values, and/or maximum or minimum values, etc.

One or more (or all) of the extracted features for each channel can be provided as input to a rubbing detection engine 740 and a blocking detection engine 750. The description provided below with respective to rubbing and blocking detection may be applied to each respective channel included in the multichannel audio input 610.

As mentioned previously, rubbing detection can be performed to determine whether a rubbing occlusion has occurred for a given audio frame (e.g., whether the corresponding microphone has experienced a rubbing occlusion). In some aspects, a rubbing occlusion can be associated with a physical contact with the microphone or microphone opening, wherein the physical contact moves (e.g., changes) over time. In one illustrative example, rubbing detection engine 740 can include a rub detector 742 and a rub state machine 744. Rub detector 742 can perform rub detection for the current frame of audio for each channel included in multichannel input 610. For example, rubbing detection can be performed based on using rub detector 742 to identify abrupt changes in envelope value (e.g., one of the features generated for each audio channel using feature extraction engine 730) for one or more channels.

In some aspects, rubbing detection can be performed based on using rub detector 742 to evaluate one or more conditions. For example, a first condition 761 can be based on the envelope value of each audio channel. In some cases, first condition 761 can compare an instantaneous envelope value (e.g., determined by feature extraction engine 730 for the current frame) to an average envelope value (e.g., a long-term or short-term average) for the same channel in order to identify abrupt changes in the envelope. In some aspects, abrupt changes in the envelope of the audio input associated with a given channel can be indicative of rubbing (e.g., rubbing may cause an abrupt increase of the amplitude measured by the microphone being rubbed). In some examples, rub detector 742 can perform rubbing detection based only on envelope changes for a given channel.

In one illustrative example, rub detector 742 can further confirm a potential rubbing event for a given channel (e.g., potentially detected based on an envelope change) by evaluating one or more power features generated for the same given channel by feature extraction engine 730. For example, rub detector 742 can further evaluate the first condition 761 by analyzing one or more power features determined for the HPF2 filter 734c. For example, an instantaneous HPF2 power value (e.g., determined for the current frame by feature extraction engine 730) can be compared to one or more pre-determined thresholds, wherein an instantaneous power that is greater than or equal to the pre-determined threshold is indicative of a rubbing event. In some examples, the instantaneous HPF2 power value can be compared to a long-term and/or a short-term average HPF2 power value to identify an abrupt change in the HPF2 power for a given channel. In some examples, the cutoff frequency of HPF2 734c can be selected to filter out wind and other noise artifacts that may be included in one or more channels of the input 610. For example, the cutoff frequency of HPF2 734c may be greater than the cutoff frequency of HPF1 734b in order to filter out wind and other noise artifacts that are not rubbing occlusions but might otherwise cause rub detector 742 to generate a false alarm.

Based on evaluating the first condition 761 for envelope value changes and/or HPF2 power value changes, rub detector 742 can output an indication of a detected rubbing event or an indication of no detected rubbing event (e.g., a binary rubbing state can be determined for the current frame of each channel). The detected rubbing state for each channel can be provided to a rub state machine 744, which can track the detected rubbing state of each channel over time. In one illustrative example, rub state machine 744 can use the rub state time series information to determine a rubbing flag 745 for each channel. For example, rub state machine 744 may set the rubbing flag 745 to true in response to rub detector 742 determining a rub event for the current frame. In some aspects, rub state machine 744 may set the rubbing flag 745 to true based on rub detector 742 determining a rub event for multiple consecutive frames, or a pre-determined percentage or quantity of frames within a confidence interval quantity of frames. In some cases, after entering the rubbing state (e.g., by setting rubbing flag 745 to true), the rub state machine 744 may remain in the rubbing state for a hangover period before exiting the rubbing state. For example, if after entering the rubbing state rub detector 742 subsequently determines at some future frame that rubbing is no longer detected, the rub state machine 744 may exit the rubbing state after waiting a pre-determined number of frames (e.g., the hangover period).

Blocking detection engine 750 can perform blocking detection to determine whether a blocking occlusion has occurred for a given audio frame (e.g., whether the corresponding microphone for a current audio frame has experienced a blocking occlusion). A blocking occlusion may be a full blocking of the microphone/microphone opening or may be a partial blocking of the microphone/microphone opening. In some aspects, blocking detection engine 750 can include a blocking qualification detector 752 that evaluates a second condition 762 to determine, based on the features generated for a given one of the current audio frames, whether the given frame is qualified for blocking detection.

For example, blocking qualification detector 752 can be used to mitigate or reduce false alarms associated with windy vectors (e.g., false blocking occlusions that might otherwise be erroneously detected due to wind noise at one of the microphones/channels included in input 610). In some aspects, blocking qualification can be performed based on evaluating the second condition 762 to determine whether the HPF2 power is greater than or equal to a pre-determined threshold. In some examples, the HPF2 power threshold associated with evaluating the second condition 762 during the blocking qualification stage may be the same as or similar to the HPF2 power threshold described above as being associated with evaluating the first condition 761 during the rubbing detection stage.

In some examples, blocking qualification detector 752 can further evaluate the second condition 762 by analyzing HPF2 power value differentials across pairs of channels included in the multichannel input 610. For example, a relatively large HPF2 channel power differential can be indicative of a blocking occlusion, while a relatively small (or approximately zero) HPF2 channel power differential can be indicative of wind noise rather than a blocking occlusion. For example, wind noise may be detected at multiple ones (or all) of the different microphone channels included in input 610, as the microphones may be provided on the same device and may experience approximately equal wind interaction. Blocking occlusions can be more localized than wind interactions, and as such may be associated with the larger HPF2 channel power differential noted above (e.g., wind noise may be experienced at most or all of the microphone channels, while blocking occlusions may be experienced at one microphone channel).

Based on evaluating the second condition 762 for HPF2 power and/or HPF2 power differentials between channel pairs, blocking qualification detector 752 can output an indication of the qualification of each channel for further blocking detection processing. For example, if blocking qualification detector 752 outputs an indication that the current frame associated with a given channel is qualified for further blocking detection processing, the current frame associated with the given channel can proceed to blocking detector 754. If blocking qualification detector 752 outputs an indication that the current frame associated with a given channel is not qualified for further blocking detection processing (e.g., because a windy vector is detected), the current frame associated with the given channel can instead proceed to the final output stage of blocking detection engine 750 (e.g., if a given channel is not qualified for blocking detection, then the final blocking flag 755 output by blocking detection engine 750 can be set to indicate no blocking for the given channel).

When blocking qualification detector 752 indicates that the current frame associated with a given channel is qualified, blocking detector 754 can performing blocking occlusion detection based on evaluating a third condition 763. For example, the third condition 763 can cause blocking detector 754 to evaluate an HPF1 channel power differential between some (or all) of the channel pairs that may be formed between the channels that are qualified for blocking detection. In some aspects, a relatively large HPF1 channel power differential may be indicative of blocking while a relatively small HPF1 channel power differential may be indicative of no blocking. For example, if the HPF1 channel power differential is evaluated as channel 1 HPF1 power-channel 2 HPF1 power and channel 2 is blocked, the channel 2 HPF1 power value will be zero or close to zero and the HPF1 power differential will evaluate to approximately equal to the channel 1 HPF1 power value. However, if neither channel 2 nor channel 1 are blocked, then the HPF1 power differential will evaluate to a relatively low value (e.g., approximately zero, if channel 1 and channel 2 are proximate to each other and both measure approximately the same sound amplitude). In some aspects, the third condition 763 can additionally, or alternatively, cause blocking detector 754 to perform blocking detection based on evaluating a ratio between the LPF power and the HPF1 power determined for each channel by feature extraction engine 730.

In some examples, the rubbing flag 745 determined for each channel by rubbing detection engine 740 can be provided as input to the blocking detector 754 of blocking detection engine 750. In some aspects, if the rubbing flag 745 is set for a given channel (e.g., if the rubbing flag 745 is set to true), then blocking detector 754 can be configured not to update some (or all) of the running power averages that are tracked for the given channel. For example, long-term and/or short-term power averages can be tracked for LPF, HPF1, and/or HPF2 power values determined for a given channel. Because in many cases, a rubbing occlusion may occur shortly prior to a blocking occlusion (e.g., a user's finger rubs on or near the edge of a microphone opening before later moving to block the microphone opening), power values that are determined for frames with rubbing flag 745 set to true should not be used to update the short-term and/or long-term power averages maintained by the blocking detector 754. In some aspects, when the rubbing flag 745 is set to true for the current frame of a given channel, blocking detector 754 can exclude the current frame power values from any averages or other updates to power estimations for the given channel.

Based on evaluating the third condition 763, blocking detector 754 can output an indication of a detected blocking event or an indication of no detected blocking event (e.g., a binary blocking state can be determined for the current frame of each channel that was qualified for blocking detection). The detected blocking state for each channel can be provided to a block state machine 756, which can track the detected blocking state of each channel over time. In one illustrative example, block state machine 756 can use the blocking state time series information to determine a blocking flag 755 for each channel. For example, block state machine 756 may set the blocking flag 755 to true in response to blocking detector 754 determining a blocking event for the current frame.

In some aspects, block state machine 756 may set the blocking flag 755 to true based on blocking detector 754 determining a blocking event for multiple consecutive frames, or a pre-determined percentage or quantity of frames within a confidence interval quantity of frames. In some cases, after entering the blocking state (e.g., by setting blocking flag 755 to true), the block state machine 756 may remain in the blocking state for a hangover period before exiting the blocking state. For example, if after entering the blocking state, blocking detector 754 subsequently determines at some future frame that blocking is no longer detected, the block state machine 756 may exit the blocking state after waiting a pre-determined number of frames (e.g., the hangover period). In some aspects, the block state machine 756 and the rub state machine 744 may use the same hangover period or may use different hangover periods.

The rubbing flag 745 that is set for each channel included in the multichannel audio input 610 by rubbing detection engine 740 and the blocking flag 755 that is set for each channel by blocking detection engine 750 can be provided to a combiner 770. Combiner 770 can determine an occlusion flag 775 for each channel, based on the respective rubbing flag 745 and the respective blocking flag 755 determined for each channel. In one illustrative example, combiner 770 can implement an OR operation, such that the occlusion flag 775 is set to true if at least one (or both) of the rubbing flag 745 and the blocking flag 755 are set to true for a given channel included in the multichannel audio input 610.

Figure 8:
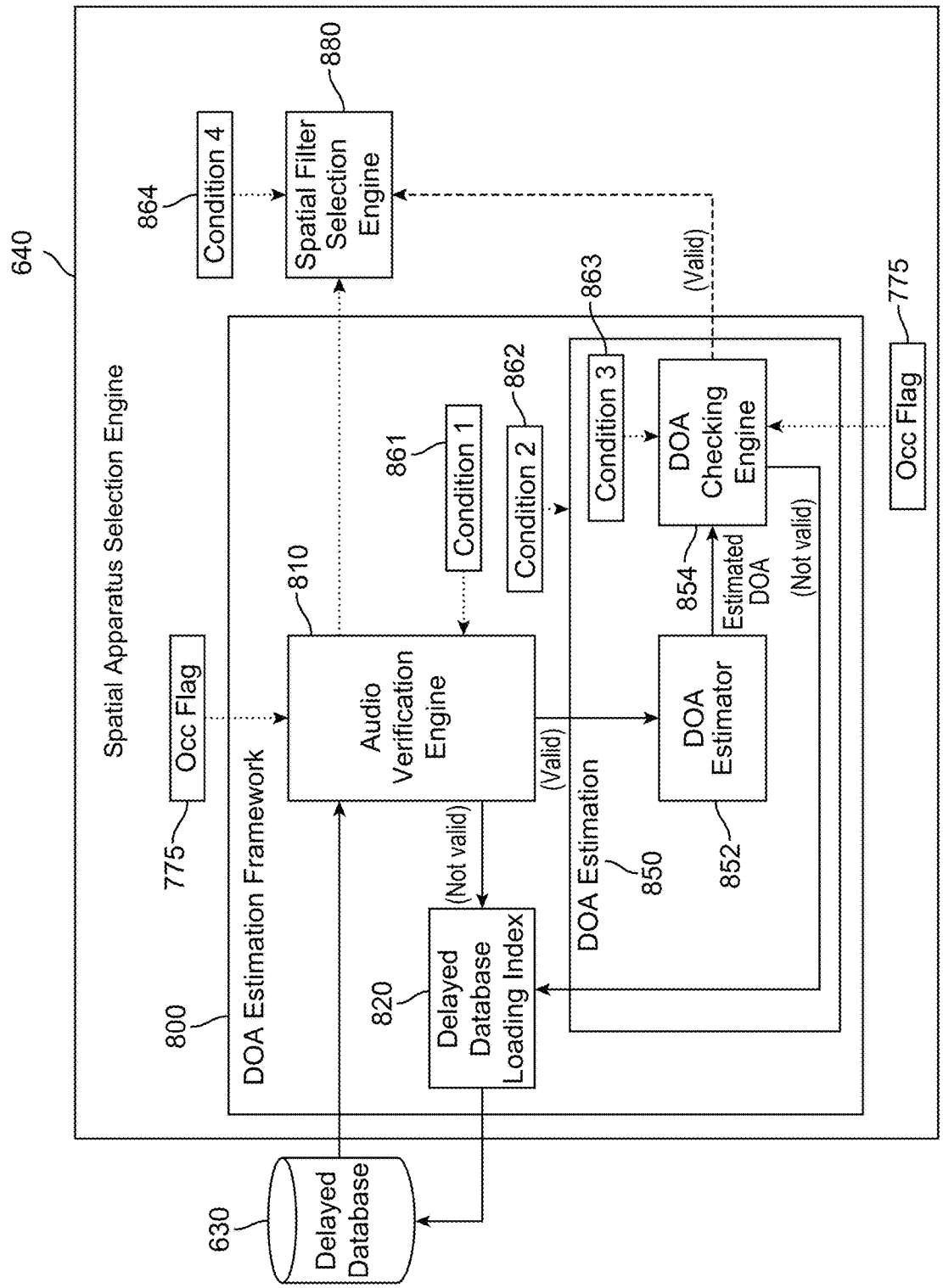
FIG. 8 is a diagram of an example spatial apparatus selection engine, in accordance with some examples.

FIG. 8 is a diagram illustrating an example architecture of the spatial apparatus selection engine 640 illustrated in FIG. 6. In one illustrative example, spatial apparatus selection engine 640 can receive as input the occlusion flag 775 determined for the current frame of each channel included in the multichannel audio input 610, wherein spatial apparatus selection engine 640 calculates spatial information and selects a spatial filter in response to the occlusion flag 775 being set to true (e.g., spatial apparatus selection engine 640 may be triggered when the occlusion flag 775 is true but not when the occlusion flag 775 is false). For example, the systems and techniques can reduce the use of computational power by only triggering spatial apparatus selection engine 640 to calculate spatial information for occluded frames (e.g., frames for which the occlusion flag 775 is set to true), rather than calculating spatial information for every frame.

As illustrated, spatial apparatus selection engine 640 can receive as input the occlusion flag(s) 775 determined by occlusion detection engine 620 for each channel included in the multichannel input 610 and can further receive as input one or more frames of delayed audio from the delayed audio database 630. For example, the occlusion flag 775 and delayed audio frames from delayed audio database 630 can be provided to a loaded audio data verification engine 810 that is included in a direction of arrival (DOA) estimation framework 800. The loaded audio data verification engine 810 can obtain (e.g., load) delayed audio of a given channel from the delayed audio database 630 in response to evaluating the occlusion flag 775 as true for a given channel. In some cases, audio verification engine 810 can load a pre-determined quantity of delayed audio frames for each channel with the occlusion flag 775 set to true. For example, audio verification engine 810 may obtain the most recent 128 delayed audio frames that are available for the respective channel(s) in delayed audio database 630.

The audio verification engine 810 can verify the loaded delayed audio frames based on evaluating a first condition 861 against the loaded delayed audio frames. In some aspects, first condition 861 can include one or more sub-conditions for evaluating the loaded delayed audio frames. For example, audio verification engine 810 can compare one or more of an L1 norm, an L2 norm, an average power, an average amplitude, a peak power, a peak amplitude, a VAD, etc., to one or more corresponding threshold values (e.g., one or more pre-determined threshold values for each sub-condition included in the first condition 861). In some aspects, power-based sub-conditions can be evaluated for some (or all) of the different power values determined at the feature extraction engine 730 illustrated in FIG. 7 (e.g., can be determined for the LPF power, HPF1 power, and/or HPF2 power).

As will be described in greater depth below with respect to FIG. 9, the audio verification engine 810 can use the first condition 861 to evaluate the suitability of the loaded delayed audio frames (e.g., obtained for each occluded channel based on the occlusion flag 775) for use in DOA estimation performed by a DOA estimation engine 850. For example, audio verification engine 810 can use the first condition 861 to evaluate whether the loaded delayed audio frames are delayed to an earlier point in time at which un-occluded audio frames were obtained for the currently occluded channel. The audio verification engine 810 may additionally use the first condition 861 to evaluate whether the loaded delayed audio frames include non-zero audio data (e.g., to verify that the loaded delayed audio frames did not capture silence or low amplitude sound).

In one illustrative example, the loaded delayed audio frames are evaluated by the audio verification engine 810, using the first condition 861, to validate whether the loaded delayed audio frames can be used for subsequent processing within the DOA estimation framework 800. For example, the loaded delayed audio frames can be validated for use in subsequent processing operations such as DOA estimation, power estimation, delay estimation, etc.

Spatial apparatus selection engine 640 can operate over delayed audio frames obtained from delayed audio database 630 in order to extract valid spatial information from audio that was recently captured for the given channel while the corresponding microphone was not occluded. For example, occlusion events may occur at any time, including during periods of silence or low sound. Valid spatial information may be difficult, or impossible, to determine from audio frames corresponding to silence or low amplitude sound. By validating that the delayed audio frames loaded from delayed audio database 630 into the DOA estimation framework 800 do not correspond to a period of silence or low amplitude sound, the systems and techniques can increase computational efficiency by only proceeding to spatial information extraction (e.g., determination) after validating that spatial information can be obtained from the delayed audio frames that are loaded from the delayed audio database 630. For example, if the loaded delayed audio frames are not validated by the audio verification engine 810, then the delayed database loading index 820 can be moved. For example, the most recent 128 frames of delayed audio frames may initially be loaded into the audio verification engine 810; if the loaded frames are not validated, then operation 820 can move the delayed database loading index and cause the audio verification engine 810 to load the second most recent set of 128 frames of delayed audio from delayed audio database 630. The process of loading delayed audio frames and moving the loading index by the delayed database loading index 820 can be repeated until delayed audio frames are loaded that pass the validation check of audio verification engine 810.

After passing the validation check of audio verification engine 810, the loaded delayed audio frames can be provided as input to a DOA estimator 852 included in DOA estimation engine 850. In some aspects, a DOA estimation technique can be selected based on evaluating a second condition 862. For example, the second condition 862 can cause the DOA estimator 852 to analyze channel map information associated with the multichannel input signal 610 (e.g., quantity of input/output channels, location information of the corresponding microphones for each channel, etc.). In some aspects, the second condition 862 can additionally, or alternatively, cause the DOA estimator 852 to analyze information such as available beamformer types, channels available for DOA estimation, etc. In some examples, DOA estimator 852 can use occlusion information determined from the occlusion flag 775 and information obtained based on evaluating the second condition 862 to determine one or more DOA estimations associated with the occluded channels.

In some examples, the one or more DOA estimations determined by DOA estimator 852 can be provided as input to a DOA checking engine 854, which evaluates the DOA estimations based on a third condition 863. In some aspects, the third condition 863 can be used to perform a recursive DOA estimation or otherwise improve the DOA estimate performance of DOA estimation engine 850. For example, the third condition 863 can cause the DOA checking engine 854 to perform a recursive DOA estimation based on information that may include, but is not limited to, arrival time difference (ATD), arrival level difference (ALD) or loudness difference, beam energy, estimated angle, cross-correlation, peak correlation, delay difference, microphone geometry and/or placement information, etc. The recursive DOA estimation performed by DOA checking engine 854 can further be based on the occlusion flag information 775 (e.g., in a manner the same as or similar to the initial DOA estimation performed by DOA estimator 852 may be based on the occlusion flag information 775).

The recursive DOA estimation output by DOA checking engine 854 can be the same as the output of the DOA estimation engine 850 and may be provided as input to a spatial filter selection engine 880. The spatial filter selection engine 880 may further receive as input the same verified delayed audio frames that were loaded by audio verification engine 810 (e.g., the same verified delayed audio frames provided from audio verification engine 810 to the DOA estimation engine 850). In one illustrative example, spatial filter selection engine 880 can select a spatial filter for restoring a spatial audio output for the occluded channels identified by the occlusion flags 775. In some aspects, the spatial filter selection can be performed based on evaluating a fourth condition 864. The fourth condition 864 can cause the spatial filter selection engine 880 to select a spatial filter based on information such as channel map information, occluded channel information, available beamformer types, etc. The selected spatial filter(s) can be used by the systems and techniques to restore a spatial audio image by reconstructing occluded audio channels using non-occluded audio channel frames.

Figure 9:
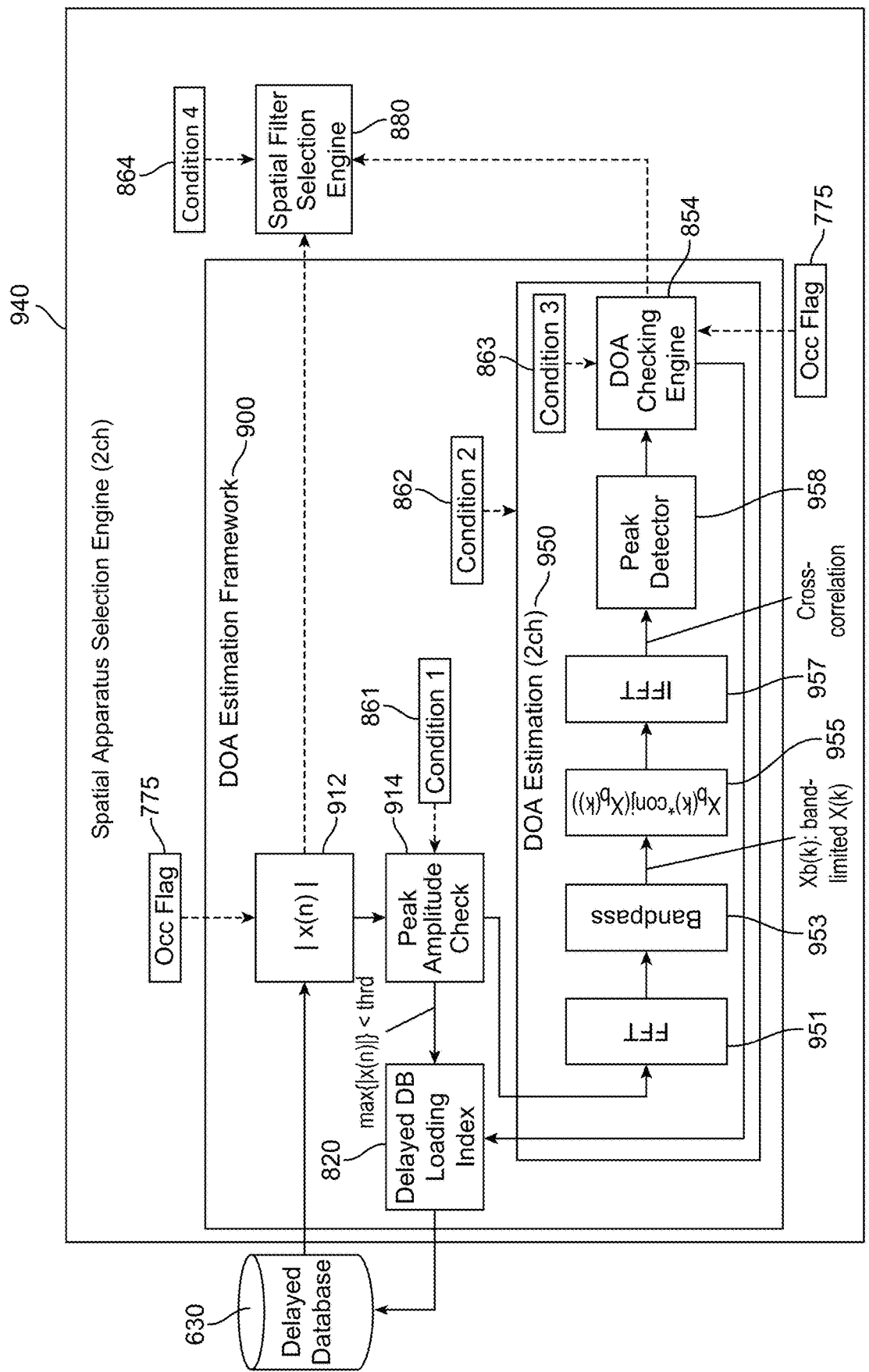
FIG. 9 is a diagram of an example spatial apparatus selection engine that receives a two-channel input signal, in accordance with some examples.

FIG. 9 is a diagram illustrating an example two-channel (e.g., stereo) spatial apparatus selection engine 940. In some cases, the two-channel spatial apparatus selection engine 940 can be used to implement the spatial apparatus selection engine 640. To verify loaded delayed audio frames from the delayed audio database 630, delayed audio frames can be loaded for two stereo channels (e.g., L and R channels) into a DOA estimation framework 900. For example, the delayed stereo audio frames can be loaded from the delayed audio database 630 to a magnitude checking engine 912. The magnitude checking engine 912 can perform a magnitude check for the delayed audio frames obtained for the occluded stereo channel indicated by the occlusion flag 775. The magnitude checking engine 912 can be used to verify that the delayed audio frames are non-zero valued (e.g., have a non-zero amplitude and do not correspond to a period of silence or near-silence), as was described above with respect to the audio verification engine 810 illustrated in FIG. 8.

The delayed stereo audio frames can subsequently be provided to an amplitude checking engine 914, which in some aspects can evaluate the delayed stereo audio frames based on first condition 861. For example, the amplitude checking engine 914 can determine a peak amplitude or peak energy of the delayed audio frames (e.g., the maximum amplitude of a delayed audio frame within the corresponding time window for which the delayed audio frames were loaded). In some aspects, amplitude checking engine 914 can use the first condition 861 to evaluate whether the peak amplitude or peak energy included within the corresponding time window for the delayed audio frames is greater than or equal to a pre-determined threshold (e.g., a pre-determined threshold given by first condition 861). If the peak amplitude is greater than or equal to the threshold of first condition 861, then the loaded delayed audio frames can proceed to DOA estimation performed by two-channel DOA estimation engine 950. If the peak amplitude is less than the threshold of first condition 861, then the analysis time window can be moved further into the past (e.g., further back in time in delayed audio database 630) and the delayed audio frame loading and verification can be iteratively repeated based on moving the loading index by the delayed database loading index 820 (e.g., as described above with respect to FIG. 8) until delayed audio frames with a peak amplitude greater than the threshold given by first condition 861 are loaded.

In one illustrative example, a two-channel (e.g., stereo) DOA estimation engine 950 can be used to perform delay estimation between the two stereo channels. For example, the stereo DOA estimation engine 950 can transform the delayed audio frames (e.g., previously validated by the peak amplitude check 914) into a frequency domain for further analysis. In some cases, the delayed audio frames can be provided to a Fast Fourier Transform (FFT) 951 and a bandpass filter 953 to obtain a band-limited frequency-domain representation of the delayed audio frames. A cross-correlation 955 can be determined based on the band-limited frequency-domain representation. In some cases, by using bandpass filter 953 to obtain the band-limited frequency domain representation of the delayed audio frames, DC-bias effects can be eliminated by ignoring bands below a certain frequency.

The cross-correlation 955 can be transformed back to the time domain using an inverse FFT (IFFT) 957. The time domain cross correlation can be provided as input to a peak detector 958, which can detect a peak location of the cross correlation (e.g., a peak location in the time domain). In one illustrative example, a delay difference between the two stereo channels can be determined based on detecting the peak location of the cross-correlation in the time domain. In some aspects, recursive delay estimation can be performed to refine the estimated delay difference between the two stereo channels. For example, the estimated delay difference will be warped if the peak location (e.g., determined by peak detector 958) is greater than half of the FFT size.

In some cases, the DOA checking engine 854 can be used to verify the estimated delay difference by correlation value and/or by the maximum delay difference given by the geometric microphone placement (e.g., the maximum delay difference possible given the distance between the two stereo microphones). For example, using the third condition 863, the DOA checking engine 854 can verify that the peak correlation is greater than a pre-determined threshold and/or that delay difference is less than or equal to the maximum delay difference possible. If the DOA estimate is verified by the DOA checking engine 854, the DOA estimate (and/or associated DOA estimation information) can be provided as input to a spatial filter selection engine 880. For example, in response to the DOA estimate being verified by the DOA checking engine 854, the spatial filter selection engine 880 can receive corresponding delay information and/or gain information associated with the DOA estimate.

If the DOA estimate is not verified by the DOA checking engine 854 (e.g., if the peak correlation is less than the pre-determined threshold of third condition 863 and/or if the delay difference is greater than the maximum delay difference possible), then the delayed database loading index 820 can be moved and the spatial apparatus selection process repeated. For example, the peak correlation determined between the delayed audio frames of the two stereo channels when using a first loading index may not be high enough (e.g., is less than the threshold) to accurately determine a delay difference between the two channels, and the first loading index will not be verified by the DOA checking engine 854. By returning to the operation performed by the delayed database loading index 820, a second loading index can be used to obtain a different set of delayed audio frames of the two stereo channels, and the cross-correlation can again be determined using the same process as described above. The process described above can be iteratively repeated until a delay estimation can be obtained with a peak correlation that is greater than or equal to the threshold given by the third condition 863. In some aspects, a termination condition can be included in the third condition 863. For example, the termination condition may indicate a maximum number of iterations that are to be performed. In some aspects, if 60 different delayed audio database loading indices have produced valid (e.g., non-zero) data but did not result in a peak correlation above the pre-determined threshold, then the DOA checking engine 854 may provide the spatial filter selection engine 880 with the maximum correlation index found in the different iterations.

Figure 10:
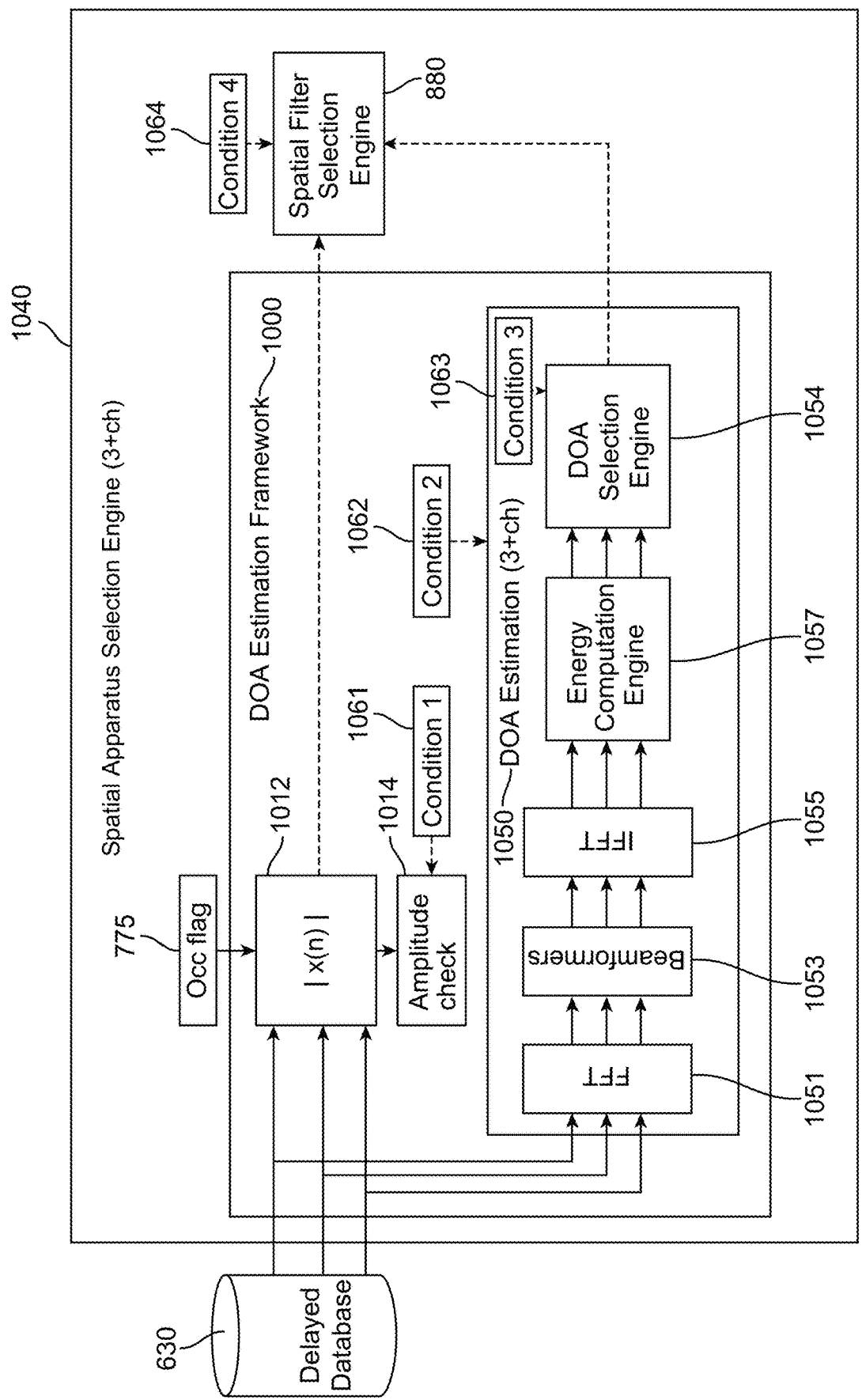
FIG. 10 is a diagram of an example spatial apparatus selection engine that receives a three-channel or greater input signal, in accordance with some examples.

FIG. 10 is a diagram illustrating an example spatial apparatus selection engine 1040 that can be used to perform spatial apparatus selection for three or more channels. In some aspects, the spatial apparatus selection engine 1040 can be used to implement the spatial apparatus selection engine 640. The spatial apparatus selection engine 1040 can include a DOA estimation framework 1000 and a DOA estimation engine 1050.

Delayed audio frames can be loaded from delayed audio database 630 for three or more channels and can be verified based on checking that the magnitude of the peak amplitude included in the delayed audio frames is greater than or equal to a pre-determined threshold given by a first condition 1061. In some examples, the first condition 1061 can be the same as or similar to the condition 861 illustrated in FIGS. 8 and 9. In one illustrative example, delayed audio frames can be loaded for each channel of the three or more channels. A magnitude determination 1012 can be obtained for each delayed audio frame and provided to a peak amplitude check 1014, which determines a maximum (e.g., peak) amplitude included in the delayed audio frames loaded for each channel. In some examples, the magnitude determination 1012 can be the same as or similar to the magnitude determination 912 illustrated in FIG. 9 and described above and/or the peak amplitude check 1014 can be the same as or similar to the peak amplitude check 914 also illustrated in FIG. 9 and also described above.

In some aspects, if the delayed audio frames loaded using a first loading index (e.g., wherein the first loading index corresponds to the most recent set of delayed audio frames written to delayed audio database 630) do not pass the peak amplitude check 1014 (e.g., have a peak amplitude less than the threshold given by first condition 1061), the loading index can be moved and the peak amplitude check 1014 can be iteratively repeated until delayed audio frames are loaded that include a peak amplitude that is greater than the threshold (e.g., in a manner that is the same as or similar to that described above with respect to operation of the delayed database loading index 820 illustrated in FIGS. 8 and 9).

After a delayed database loading index has been found for which the delayed audio frames loaded for each channel (e.g., of the three or more channels) pass the peak amplitude check 1014, the loaded delayed audio frames can be provided as input to DOA estimation engine 1050. In one illustrative example, the DOA estimation engine 1050 can be configured to perform DOA estimation for three or more channels of delayed audio frames based on performing multi-microphone beamforming in the frequency domain. For example, the loaded and validated delayed audio frames for each channel can be transformed into the frequency domain using a frequency domain conversion 1051. In some aspects, the frequency domain conversion can be an FFT 1051, which can be the same as or similar to FFT 951 illustrated in FIG. 9 (a corresponding IFFT 1055 may be the same as or similar to IFFT 957 illustrated in FIG. 9).

In one illustrative example, the loaded and validated delayed audio frames can be used by DOA estimation engine 1050 to perform multi-microphone beamforming in the FFT domain. For example, DOA estimation engine 1050 can implement a plurality of beamformers 1053 that divide a 360-degree sound field (e.g., centered about the device that includes the microphones used to obtain the three or more channels of audio frames) into different portions or directions. A beamformer can be determined for each of the divided portions or directions of the 360-degree sound field. For example, the 360-degree sound field may be divided into 8 different directions and each direction may be set as a beamformer.

Each beamformer included in the plurality of beamformers 1053 can be associated with a plurality of beamformer coefficients. For example, the beamformer coefficients associated with a given one of the beamformers 1053 can be pre-determined (e.g., generated offline and/or in advance) based on the direction of the beamformer and geometry information of the microphone locations. For example, the geometry information can include geometry information of the microphone locations on the same audio capture device and/or geometry information of the microphone locations relative to one another. In one illustrative example, the plurality of beamformers 1053 can be implemented based on a bank of beamformer coefficients that are designed for different directions of arrival (DOA) (e.g., the different directions used to divide the 360-degree sound field around the multi-microphone device). In some aspects, a second condition 1062 can include one or more (or both) of the beamformer information (e.g., the beamformer directions and/or the bank of beamformer coefficients) and the microphone location geometry information.

The FFT domain delayed audio for each channel can be provided as input to the bank of beamformer coefficients 1053. Based on the bank of beamformer coefficients, the beamformer output for each given beamformer/direction can be generated based on combining the FFT domain delayed audio of each channel as weighted by the corresponding beamformer coefficients. The FFT beamformer outputs for each direction can be transformed back to the time domain using IFFT 1055. The time domain beamformer outputs for each direction can be provided as input to an energy computation engine 1057, which determines the energy of each beamformer output. DOA selection engine 1054 can be performed based on evaluating a third condition 1063, which in some aspects may be the same as or similar to the third condition 863 illustrated in FIGS. 8 and 9.

In one illustrative example, evaluating the third condition 1063 can cause the DOA selection engine 1054 to select the direction with the highest energy in the corresponding beamformer output. For example, the estimated DOA determined by DOA estimation engine 1050 can be the direction of the beamformer output with the highest energy. The estimated DOA can be provided as input to spatial filter selection engine 880, which can select a spatial filter to be used to restore spatial audio processing when one or more microphones are occluded. For example, the spatial filter selection engine 880 can perform the spatial filter selection using the estimated DOA from DOA estimation engine 1050 and based on evaluating a fourth condition 1064, in a manner the same or similar to that described with respect to the spatial filter selection performed by spatial filter selection engine 880 with respect to FIG. 8 and/or FIG. 9.

Figure 11:
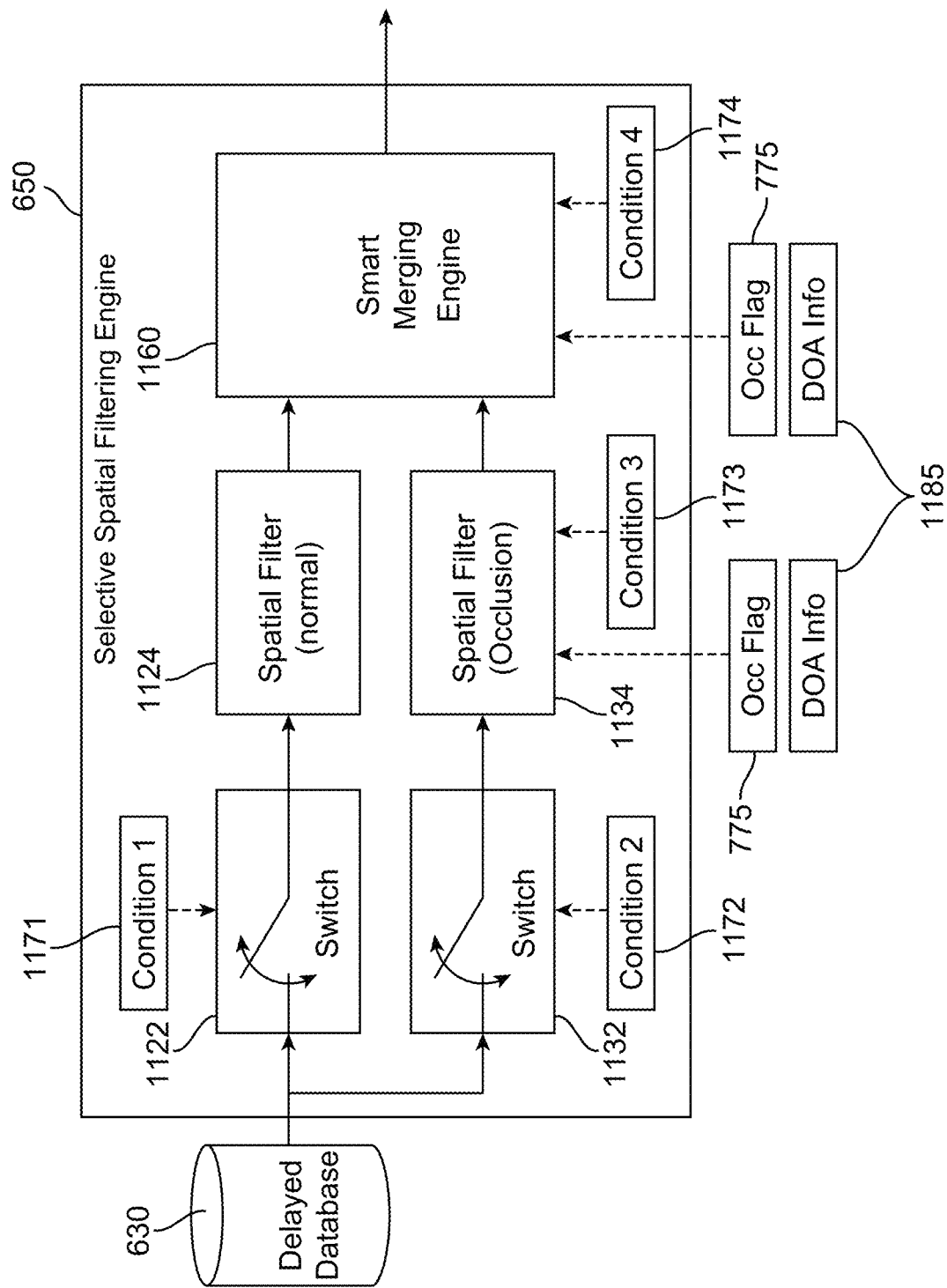
FIG. 11 is a diagram of an example selective spatial filtering engine, in accordance with some examples.

FIG. 11 is a diagram illustrating an example architecture that can be used to implement the selective spatial filtering engine 650 illustrated in FIG. 6. As illustrated, selective spatial filtering engine 650 can obtain as input delayed audio frames (e.g., for each channel included in the multichannel input 610 illustrated in FIG. 6) from delayed audio database 630. A first spatial filtering path can include a first switch 1122 and a first spatial filter 1124 for non-occluded (e.g., normal) spatial filtering. The first spatial filtering path may also be referred to as a non-occluded spatial filtering path. A second spatial filtering path can include a second switch 1132 and a second spatial filter 1134 for occluded spatial filtering. The second spatial filtering path may also be referred to as an occluded spatial filtering path.

In some examples, the selective spatial filtering engine 650 can be integrated into or implemented using one or more processors. For example, selective spatial filtering engine 650 can be implemented using processor 1710 illustrated in FIG. 17. In some cases, selective spatial filtering engine 650 can be implemented using a processor included in the multi-microphone device 102 illustrated in FIG. 1. The processor included in multi-microphone device 102 may be the same as or similar to the processor 1710 illustrated in FIG. 17. In some examples, selective spatial filtering engine 650 can be implemented using firmware running on a processor (e.g., such as processor 1710 illustrated in FIG. 17).

In some aspects, the first spatial filter 1124 can be a non-occluded spatial filter and the second spatial filter 1134 can be an occluded spatial filter. In some examples, first spatial filter 1124 can include one or more filter banks for performing non-occluded spatial filtering. For example, the one or more filter banks can each be different filter banks that utilize different combinations of microphone channel inputs to generate a spatial audio output. In some examples, second spatial filter 1134 can include one or more filter banks for performing occluded spatial filtering. For example, the one or more filter banks included in second spatial filter 1134 can each be different filter banks that utilize different combinations of microphone channel inputs to generate a spatial audio output. In some aspects, the spatial audio output generated using the one or more filter banks included in second spatial filter 1134 can be restored spatial audio outputs that are generated for an occluded microphone, using one or more audio frames captured using one or more non-occluded microphones as input. In some cases, some (or all) of the one or more filter banks included in first spatial filter 1124 (e.g., a non-occluded spatial filter) can be different than the one or more filter banks included in the second spatial filter 1134 (e.g., an occluded spatial filter). In some aspects, a quantity of filter banks included in first spatial filter 1124 can be greater than or equal to a quantity of filter banks included in second spatial filter 1134.

In some examples, the first switch 1122 and the second switch 1132 can be implemented using a single switch (e.g., a single switch can include the first switch 1122 and the second switch 1132). For example, a single switch that implements first switch 1122 and second switch 1132 can receive as input the one or more delayed audio frames from delayed audio database 630, the first condition 1171, and the second condition 1172. Based at least in part on first condition 1171 and second condition 1172, the single switch can control (e.g., open and close) the first switch 1122 and can control (e.g., open and close) the second switch 1132.

In one illustrative example, the first switch 1122 can be controlled based on evaluating a first condition 1171 and the second switch 1132 can be controlled based on evaluating a second condition 1172. For example, the first and second conditions 1171, 1172 can be evaluated based on an occlusion flag (e.g., such as occlusion flag 775), an occlusion onset/offset transition, etc.

In one illustrative example, the first switch 1122 can be closed (e.g., the non-occluded spatial filtering path can be utilized) and the second switch 1132 can be opened (e.g., the occluded spatial filtering path is deactivated) when no occlusion is present in the currently processed frames of delayed audio. Because the occluded spatial filtering path is deactivated (e.g., by opening second switch 1132) when no occlusion is present for the currently processed frames, the output of the spatial filter 1124 can be the same as the final spatial audio output of selective spatial filtering engine 650 (e.g., the input and output of smart merging engine 1160 are the same).

In another illustrative example, the first switch 1122 can be opened (e.g., the non-occluded spatial filtering path is not utilized) and the second switch 1132 can be closed (e.g., the occluded spatial filtering path is utilized) when occlusion is present for one or more of the currently processed frames of delayed audio. Because the non-occluded spatial filtering path is deactivated (e.g., based on opening first switch 1122) when occlusion is present for the currently processed frames, the output of the spatial filter 1124 can be the same as or similar to the final spatial audio output of selective spatial filtering engine 650 (e.g., smart merging engine 1160 does not merge the outputs of the non-occluded and occluded spatial filtering paths).

For example, the first switch 1122 can be controlled based on evaluating the first condition 1171 such that first switch 1122 is closed when occlusion flag 775 is false (e.g., occlusion not present) and is opened when occlusion flag 775 is true (e.g., occlusion is present). In some aspects, the second switch 1132 can be controlled based on evaluating the second condition 1172 such that second switch 1132 is closed when occlusion flag 775 is true (e.g., occlusion present) and is opened when occlusion flag 775 is false (e.g., no occlusion present).

The occluded spatial filtering 1134 can be performed based on the estimated DOA information determined using the spatial apparatus selection engine 640 (and/or the spatial apparatus selection engine 940 and/or the spatial apparatus selection engine 1040). In some cases, the occluded spatial filtering 1134 can be implemented using a spatial filter determined using the spatial filter selection engine 880 illustrated in one or more of FIGS. 8-10. Aspects of the occluded spatial filtering will be described in greater depth below with respect to FIGS. 12 and 13.

Referring to the architecture of selective spatial filtering engine 650 illustrated in FIG. 11, the occluded spatial filtering 1134 can be performed based at least in part on a third condition 1173. For example, the third condition 1173 can include information such as a quantity of channels, a non-occluded channel map, occluded channel information, channel map information, etc. The occluded spatial filtering 1134 can additionally, or alternatively, receive as input occlusion flag 775 and DOA information 1185. For example, DOA information 1185 can include a delay difference between channels (e.g., for stereo inputs), an estimated DOA (e.g., for 3+channel inputs where beamforming is used), etc.

Smart merging engine 1160 can be used to merge the non-occluded spatial filtering 1124 output and the occluded spatial filtering 1134 output. For example, during an occlusion onset and/or occlusion offset period, both the first switch 1122 and the second switch 1132 can be closed (e.g., and both the non-occluded and the occluded spatial processing paths may be activated). During the occlusion onset and/or occlusion offset transitions, smart merging engine 1160 can perform cross-fading and merging between the occluded and non-occluded spatial outputs to provide a smoother transition that is less audible, or inaudible, to a listener. In one illustrative example, the occlusion onset and/or occlusion offset transition periods can be shorter than a delay period associated with a delayed audio database (e.g., delayed audio database 630). For example, the occlusion onset and/or occlusion offset transition periods associated with smart merging engine 1160 can be shorter than the delay period associated with the delay filter $z^{-m}$ 615 illustrated in FIG. 6 (e.g., which delays multichannel audio input 610 by m samples before being written to delayed audio database 630). As illustrated in FIG. 6, selective spatial filtering engine 650 (e.g., which may include a smart merging engine such as smart merging engine 1160) can receive as input information associated with the delay filter $z^{-m}$ 615. In some aspects, the occlusion onset and occlusion offset transition periods can be the same. In one illustrative example, the occlusion onset and occlusion offset transition periods may be between 30-40 milliseconds (ms).

In some cases, the occlusion onset and/or occlusion offset periods can be used to provide a smooth transition between the non-occluded spatial filtering processing path output (e.g., associated with first switch 1122) and the occluded spatial filtering processing path output (e.g., associated with second switch 1132). In some aspects, the occlusion onset period associated with smart merging engine 1160 can be used to provide forgiveness or tolerance for slow onset detection of an occlusion event. For example, a slow detection of an occlusion event may occur when one or more initial audio frames corresponding to an occlusion event are not detected (e.g., are not detected by the occlusion detection engine 620 illustrated in FIGS. 6 and 7). In some cases, slow detection of an occlusion event may be more likely to occur if the occlusion occurs at the border of the frame. For example, based on the occlusion onset period being less than the delay period associated with delayed audio database 630, smart merging engine 1160 can trigger and perform merging even if the first frame(s) of an occlusion event are missed or otherwise not detected.

In some aspects, smart merging engine 1160 can perform smart merging based on a fourth condition 1174. For example, fourth condition 1174 can be based on or include channel map information, occluded channel information, etc. In some cases, smart merging engine 1160 can additionally, or alternatively, receive as input the occlusion flag 775 and the DOA information 1185 (e.g., the same as or similar to the occlusion flag 775 and DOA information provided as input to the occluded spatial filtering 1134).

Figure 12:
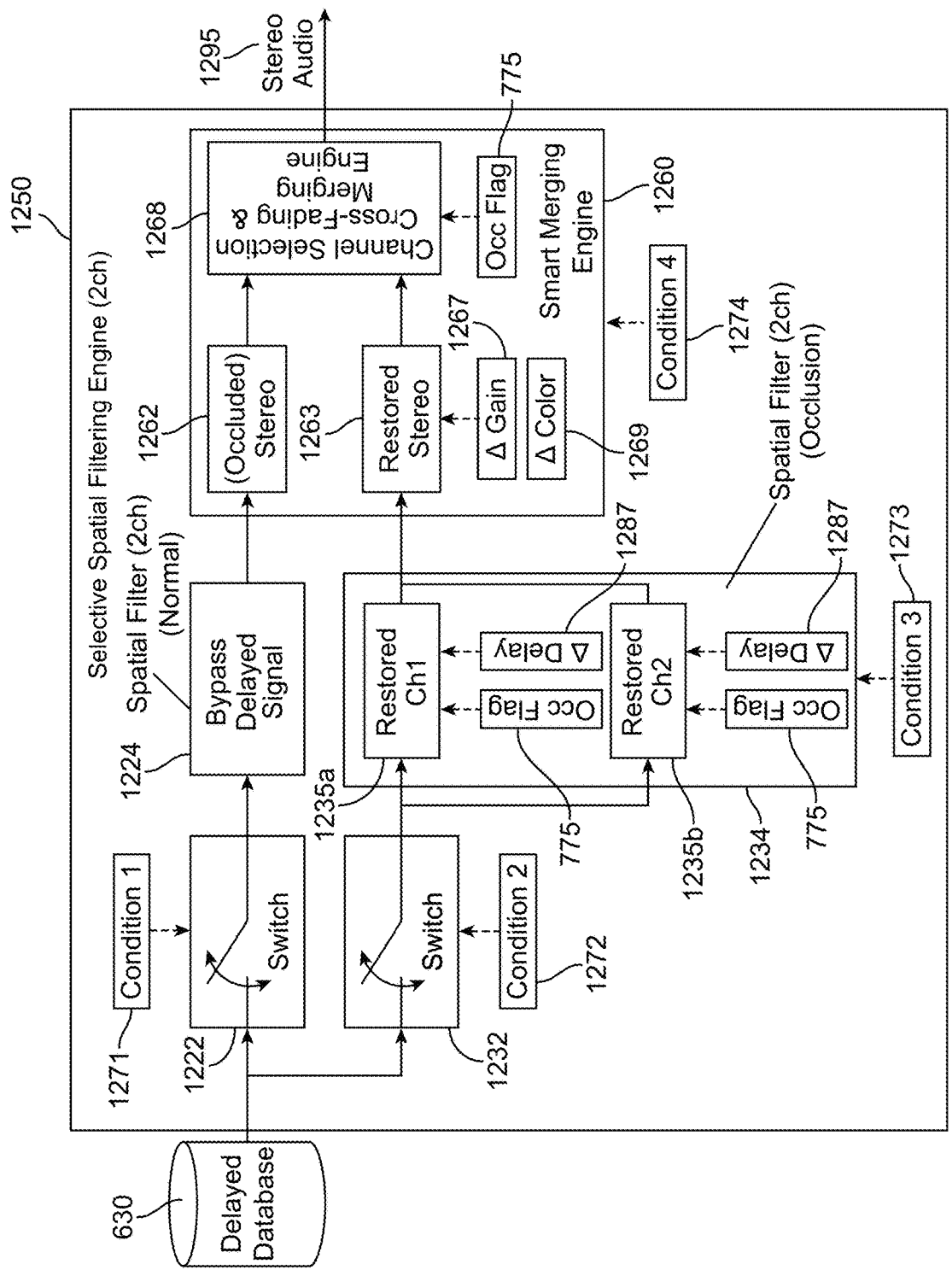
FIG. 12 is a diagram of an example selective spatial filtering engine that receives a two-channel input signal, in accordance with some examples.

FIG. 12 is a diagram illustrating an example architecture of a two-channel (e.g., stereo) selective spatial filtering engine 1250 that may be used to implement the selective spatial filtering engine 650. The stereo selective spatial filtering engine 1250 can include a first switch 1222 that is the same as or similar to the first switch 1122 illustrated in FIG. 11 and can include a second switch 1232 that is the same as or similar to the second switch 1132 illustrated in FIG. 11. In some examples, a first condition 1271 associated with first switch 1222 can be the same as or similar to the first condition 1171 associated with first switch 1122 illustrated in FIG. 11. In some examples, a second condition associated with second switch 1232 can be the same as or similar to the second condition 1172 associated with second switch 1132 illustrated in FIG. 11.

First switch 1222 can be used to activate and deactivate a non-occluded spatial processing path (e.g., as described above with respect to first switch 1122 illustrated in FIG. 11). For example, when first switch 1222 is closed, the non-occluded spatial processing path is activated and the delayed audio frames from delayed audio database 630 can be provided as input to a non-occluded spatial filtering 1224. In some examples, the non-occluded spatial filtering 1224 can be performed based on bypassing the delayed signal associated with the output of delayed audio database 630 (e.g., when occlusion is not present, the delayed audio frames from delayed audio database 630 can be provided as input to the non-occluded spatial processing path).

The stereo selective spatial filtering engine 1250 can receive as input (e.g., from delayed audio database 630) delayed audio frames corresponding to a first and second channel (e.g., L and R channels), one of which is occluded and one of which is non-occluded. For example, an occlusion may be detected in the current frame of the L or R channel, while the remaining channel is un-occluded in its current frame. However, the selective spatial filtering engine 1250 obtains delayed audio frames from delayed audio database 630 as input, and occluded audio frames (e.g., associated with the occlusion detected beginning with the current frame) are not provided to selective spatial filtering engine 1250 for a period of time equal to the delay associated with implementing delayed audio database 630.

In one illustrative example, during the occlusion onset period (e.g., the period of time between the occlusion being detected for the current audio frame and the current audio frame subsequently being written to and loaded from the delayed audio database 630 the selective spatial filtering engine 1250 can crossfade between and merge the spatial output generated using the non-occluded spatial filtering 1224 and the restored spatial output generated using the occluded spatial filtering 1234.

The occluded spatial filtering 1234 can use the non-occluded stereo channel to generate a restored signal for the occluded stereo channel. In some examples, the occluded spatial filtering 1234 can be performed based on a third condition 1273 that may be the same as or similar to the third condition 1173 illustrated in FIG. 11 as being associated with the occluded spatial filtering 1134. For example, if channel 1 is occluded and channel 2 is non-occluded, the occluded spatial filtering 1234 can generate a restored channel 1 signal using the non-occluded channel 2. If channel 1 is non-occluded and channel 2 is occluded, the occluded spatial filtering 1234 can generate a restored channel 2 signal using the non-occluded channel 1. In some aspects, the restored channel signal can be generated based on audio frames of the non-occluded channel and information associated with third condition 1273 (e.g., occlusion channel information, occlusion flag(s), channel mapping information, etc.). In one illustrative example, the occluded channel restoration engines 1235a, 1235b (e.g., associated with generating a restored channel 1 signal and a restored channel 2 signal, respectively) can receive as input the delayed audio frames loaded from delayed audio database 630. The occluded and non-occluded channel can be identified based on the occlusion flag 775. The restored signal for the occluded channel can be generated using the delayed audio frames associated with the non-occluded channel and a delay difference 1287.

For example, the delay difference 1287 can be included in the DOA information 1185 illustrated in FIG. 11, which can be the same as or similar to the estimated delay difference determined using the spatial apparatus selection engine 640 and/or the spatial apparatus selection engine 940. In some aspects, the delay difference 1287 can be indicative of an estimated delay between a same sound source being detected at the microphone associated with the occluded channel and being detected at the microphone associated with the non-occluded channel. In some aspects, the audio frames of the occluded channel can be adjusted by the estimated delay difference to generate the restored channel signal for the occluded channel. In one illustrative example, the occluded spatial filtering 1234 can be implemented based at least in part on the spatial filter determined using the spatial filter selection engine 880 included in the spatial apparatus selection engine 640 illustrated in FIG. 8 and the spatial apparatus selection engine 940 illustrated in FIG. 9.

The restored channel signal and the non-occluded channel signal can be provided to smart merging engine 1260 as a restored stereo signal 1263. In one illustrative example, the smart merging engine 1260 can apply one or more of a gain (e.g., loudness) adjustment 1267 and/or a coloration adjustment 1269. For example, the gain adjustment 1267 can be implemented as an increase or decrease in the gain (e.g., loudness) of the restored stereo signal 1263. In some aspects, the coloration adjustment 1269 (e.g., also referred to as a coloration shift) can be implemented to change the coloration (e.g., pitch, timbre, etc.) of the restored stereo signal 1263. For example, coloration adjustment 1269 can be a coloration shift determined based on geometry information associated with one or more microphones used to captured the audio frames obtained from delayed audio database 630.

In some aspects, the smart merging engine 1260 can be configured using a fourth condition 1274. For example, the fourth condition 1274 can include or otherwise be based on information that can include, but is not limited to, occluded channel information, occlusion status information, etc. In some examples, the smart merging engine 1260 can apply the gain adjustment 1267 and/or the coloration adjustment 1269 to the restored stereo signal 1263. In some aspects, the gain adjustment 1267 can be estimated or determined based on the geometry information of the two microphones associated with the two stereo channels. For example, an estimated gain difference can be determined based on the distance between the occluded microphone and the non-occluded microphone. If the occluded microphone is closer to the sound source associated with the DOA estimate than the non-occluded microphone, the gain adjustment 1267 can be selected to increase the loudness of the restored channel signal for the occluded channel. If the occluded microphone is farther from the sound source than the non-occluded microphone, the gain adjustment 1267 can be selected to decrease the loudness of the restored channel signal of the occluded channel.

The coloration adjustment 1269 can estimated or determined based on the geometry information of the two microphones associated with the two stereo channels. For example, the systems and techniques can determine that a sound source signal captured by the occluded microphone is associated with a different coloration than the same sound source signal as captured by the non-occluded microphone. Because the restored occluded channel signal is generated based on applying a delay adjustment and a gain adjustment to the non-occluded channel signal, the coloration of the restored occluded channel signal and the non-occluded channel signal would be the same or similar. Based on applying the coloration adjustment 1269 to the restored occluded channel signal, the smart merging engine 1260 can restore the coloration difference(s) that are present between the two stereo microphones when both microphones capture non-occluded sound signals.

The restored stereo signal 1263 and the occluded stereo signal 1262 can be provided as input to a crossfading and merging engine 1268 included in the smart merging engine 1260. As mentioned previously, smart merging engine 1260 can crossfade between the two signals 1262 and 1263 during the transition window between the time at which occlusion is detected for the current frame and the future time at which the current frame is loaded from the delayed database 630 and into the selective spatial filtering engine 1250. The output of the crossfading and merging engine 1268 (e.g., and the output of the selective spatial filtering engine 1250) is a restored stereo audio signal 1295 that crossfades between normal (e.g., non-occluded) spatial filtering 1224 at the time an occlusion is detected and the occluded spatial filtering 1234 by the subsequent time at which the occluded audio frames are loaded from the delayed audio database 630 and processed by the selective spatial filtering engine 1250.

Figure 13:
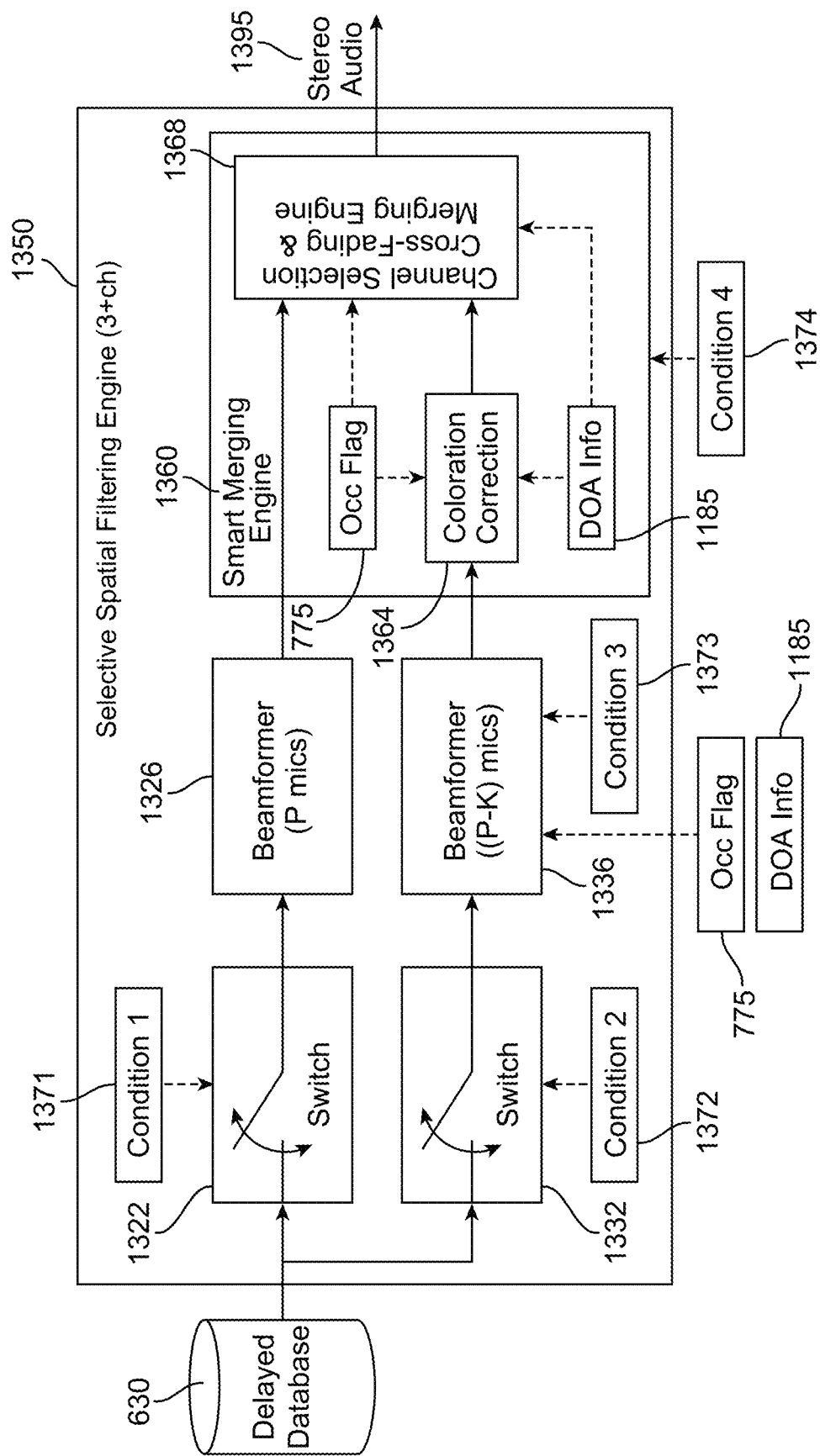
FIG. 13 is a diagram of an example selective spatial filtering engine that receives a three-channel or greater input signal, in accordance with some examples.

FIG. 13 is a diagram illustrating an example architecture of a selective spatial filtering engine 1350 that can be used to perform selective spatial filtering for multichannel input signals including three or more audio channels. In some aspects, selective spatial filtering engine 1350 can be used to implement the selective spatial filtering engine 650. The selective spatial filtering engine 1350 can include a first switch 1322 that can be the same as or similar to the first switch 1122 illustrated in FIG. 11 and/or the same as or similar to the first switch 1222 illustrated in FIG. 12. The selective spatial filtering engine 1350 can additionally include a second switch 1332 that can be the same as or similar to the second switch 1132 illustrated in FIG. 11 and/or the second switch 1232 illustrated in FIG. 12. First switch 1322 can be opened and closed (e.g., controlled) based on a first condition 1371 that can be the same as or similar to the first condition 1171 illustrated in FIG. 11 and/or the first condition 1271 illustrated in FIG. 12. Second switch 1332 can be opened and closed (e.g., controlled) based on a second condition 1372 that can be the same as or similar to the second condition 1172 illustrated in FIG. 11 and/or the second condition 1272 illustrated in FIG. 12.

In one illustrative example, the selective spatial filtering engine 1350 can generate reconstructed channel signals for one or more occluded channels by using beamforming. For example, selective spatial filtering engine 1350 can perform spatial filtering that selectively restores a spatial audio output by generating reconstructed channel signals for the one or more occluded channels based on generating one or more beamforming outputs using the spatial filter(s) selected by the spatial apparatus selection 1040 illustrated in FIG. 10. In some aspects, the reconstructed channel signals for the one or more occluded channels can be generated as beamformer outputs based on the DOA selection engine 1054 and/or spatial filter selection engine 880 illustrated in FIG. 10.

Figure 14B:
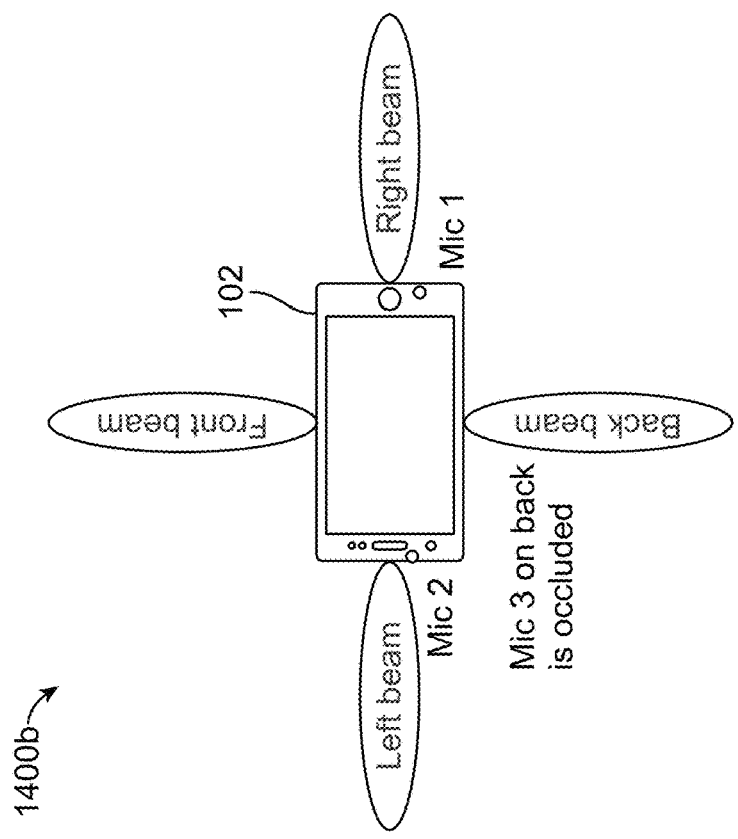
FIG. 14B is a diagram illustrating an example of restored selective spatial filtering based on two non-occluded microphone input signals and one occluded microphone input signal, in accordance with some examples.
Figure 14A:
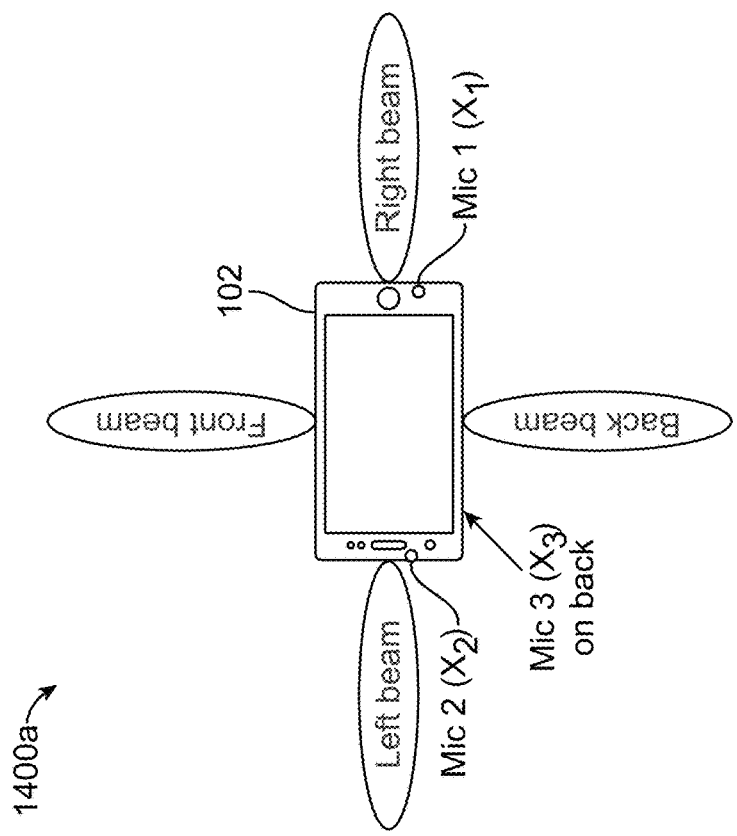
FIG. 14A is a diagram illustrating an example of selective spatial filtering based on three non-occluded microphone input signals, in accordance with some examples.

In some aspects, a non-occluded spatial filtering processing path can be implemented based on generating one or more beamformer outputs 1326. For example, FIG. 14A is a diagram illustrating an example of four beamformer outputs that can be generated using three audio frames captured by three non-occluded microphones of device 102. As illustrated, a left beamformer output, right beamformer output, front beamformer output, and back beamformer output can be generated based on audio frames captured by three microphones (e.g., Mic 1, Mic 2, and Mic 3). For example, the first microphone can capture first audio frames $X_1$, the second microphone can capture second audio frames $X_2$, and the third microphone can capture third audio frames $X_3$. In some aspects, each beamformer output (e.g., of the four total beamformer outputs) can be generated as $W_1 X_1(n,K) + W_2 X_2(n,K) + W_3 X_3(n,K)$, where $W_1$-$W_3$ are beamformer weights for a given beam direction (e.g., each of the four beamformers can have different $W_1$-$W_3$ weight values) and n and K are time and frequency indices, respectively.

With respect to FIG. 13, the non-occluded spatial processing path can generate a plurality of beamformer outputs 1326 using P microphone inputs. For example, if P=3 (e.g., as in the example of FIG. 14A, which includes P=3 microphones), the plurality of beamformer outputs 1326 can each be generated based on applying different beamformer weightings or coefficients to the audio frames captured using the respective P=3 microphones. When one or more microphones are occluded (e.g., when one or more of the P microphones/channels are occluded), the corresponding ones of the audio frames $X_1$, $X_2$, $X_3$ may include degraded or zero-valued amplitude information. Because the beamformer outputs 1326 are each generated as $W_1 X_1(n,K) + W_2 X_2(n,K) + W_3 X_3(n,K)$, a beamformer output that includes a non-zero beamformer coefficient or weighting for the one or more occluded audio frames in $X_1$, $X_2$, and/or $X_3$ may lose spatial sense.

For example, the three microphones (e.g., Mic 1, Mic 2, Mic 3) may each be un-occluded in FIG. 14A. As depicted in FIG. 14B, one of the microphones (e.g., Mic 3) may be occluded, while the two remaining microphones (e.g., Mic 1 and Mic 2) are un-occluded. When Mic 3 is occluded, the audio frames $X_3$ captured by the occluded Mic 3 may measure a zero or approximately zero-valued amplitude (e.g., based on Mic 3 being fully blocked by a user's hand or finger). In some aspects, when Mic 3 is occluded, the audio frames $X_3$ captured by the occluded Mic 3 may measure a distorted or degraded amplitude (e.g., the amplitude may be increased based on noise from the user's finger causing a rubbing occlusion, may be decreased to a non-zero value based on a partial blocking occlusion, etc.)

In some cases, one or more, or all, of the beamformer outputs generated using the non-occluded audio frames $X_1$ and $X_2$ and the occluded audio frames $X_3$ may become corrupted or otherwise lose spatial sense. For example, as mentioned previously, the beamformer outputs 1326 generated using a bank of non-occluded beamformer coefficients (e.g., generated based on $W_1X_1(n,K)+W_2X_2(n,K)+W_3X_3(n,K)$) can become corrupted or lose spatial sense for any beamformer output that includes non-zero valued coefficients $W_3$.

In one illustrative example, the systems and techniques described herein can generate a plurality of spatially restored beamformer outputs 1336, wherein the restored beamformer outputs are generated using P-K non-occluded microphone channels (e.g., where P represents the total quantity of microphone channels and K represents the quantity of non-occluded) as inputs for generating the spatially restored beamformer outputs. For example, when Mic 3 illustrated in FIG. 14B is occluded (e.g., with Mic 1 and Mic 2 remaining non-occluded), the spatially restored beamformer outputs can each be generated as $W'_1X_1(n,K)+W'_2X_2(n,K)$. In some aspects, the four spatially restored beamformer outputs (e.g., left, right, front, back) can each be generated using different, respective beamformer coefficients $W'_1$ and $W'_2$.

In one illustrative example, the spatially restored beamformer outputs depicted in FIG. 14B may be generated using the selective spatial filtering engine 1350 of FIG. 13. For example, the beamformer coefficients $W'_1$ and $W'_2$ can be determined using the spatial filter selection engine 880 included in the 3+channel spatial apparatus selection engine 1040 illustrated in FIG. 10 and/or can be determined using the spatial filter selection engine 880 included in the spatial apparatus selection engine 640 illustrated in FIG. 6.

In some aspects, the spatially restored beamforming 1336 can be performed using audio frames associated with a set of P-K non-occluded microphones determined based on the occlusion flag(s) 775 and/or the DOA information 1185. In some examples, the spatially restored beamforming 1336 can be performed based at least in part on a third condition 1373. For example, the third condition 1373 may be the same as or similar to the third condition 1273 illustrated in FIG. 12 and/or the third condition 1173 illustrated in FIG. 11. Spatially restored beamforming 1336 can output a set of beamformers that are the same as or similar to the beamformers output by the non-occluded beamforming 1326 (e.g., spatially restored beamforming 1336 and non-occluded beamforming 1326 can both output the same quantity of beamformers each having the same respective direction, etc.). The spatially restored beamforming 1336 can output beamformers generated using the P-K non-occluded outputs while the non-occluded beamforming 1326 can output beamformers generated using all P of the microphone inputs.

The restored beamforming outputs of spatially restored beamforming 1336 and the non-occluded beamforming outputs of non-occluded beamforming 1326 can be provided as inputs to the smart merging engine 1360, which may crossfade and merge the two beamforming outputs in a manner the same as or similar to that in which smart merging engine 1220 crossfades and merges the restored stereo signal and the occluded stereo signal (e.g., as described above with respect to FIG. 12).

In one illustrative example, smart merging engine 1360 can include a coloration correction engine 1364 that receives the spatially restored beamforming 1336 output and performs coloration correction based on occlusion flag 775 and DOA information 1185. For example, the coloration correction can be performed in a manner the same as or similar to that described above with respect to the coloration correction performed by smart merging engine 1260 illustrated in FIG. 12. In some examples, the smart merging engine 1360 can implement or otherwise be controlled based on a fourth condition 1374. For example, the fourth condition 1374 may be the same as or similar to the fourth condition 1274 illustrated in FIG. 12 and/or the fourth condition 1174 illustrated in FIG. 11. In some aspects, the fourth condition 1374 can include or indicate occluded channel information, occlusion status, etc.

The coloration correction 1364 can be performed to provide a coloration adjustment (e.g., coloration shift) to one or more (or all) of the spatially restored beamforming 1336 outputs. For example, the spatially restored beamformers 1336 and the non-occluded beamformer 1326 may be generated for the same beamforming directions (e.g., the right, left, front, back beamformers illustrated in FIGS. 14A and 14B), but can be associated with different sound coloration (s) based on the non-occluded beamformers 1326 being generated using a different combination of microphone audio frames (e.g., $W_1X_1(n,K)+W_2X_2(n,K)+W_3X_3(n,K)$) than the spatially restored beamformers 1336 (e.g., generated based on $W'_1X_1(n,K)+W'_2X_2(n,K)$). In some aspects, the coloration correction 1364 can determine a difference between the coloration information associated with each respective one of the non-occluded beamforming outputs 1326 and the corresponding spatially restored beamforming output 1336. Based on the coloration difference for each given pair of a non-occluded beamforming output 1326 and the corresponding spatially restored beamforming output 1336, the coloration correction 1364 can adjust the spatially restored beamforming outputs 1336. For example, the coloration of the spatially restored beamforming outputs 1336 can be adjusted (e.g., by coloration correction 1364) to match the expected coloration of the corresponding non-occluded beamforming outputs 1326.

Figure 15:
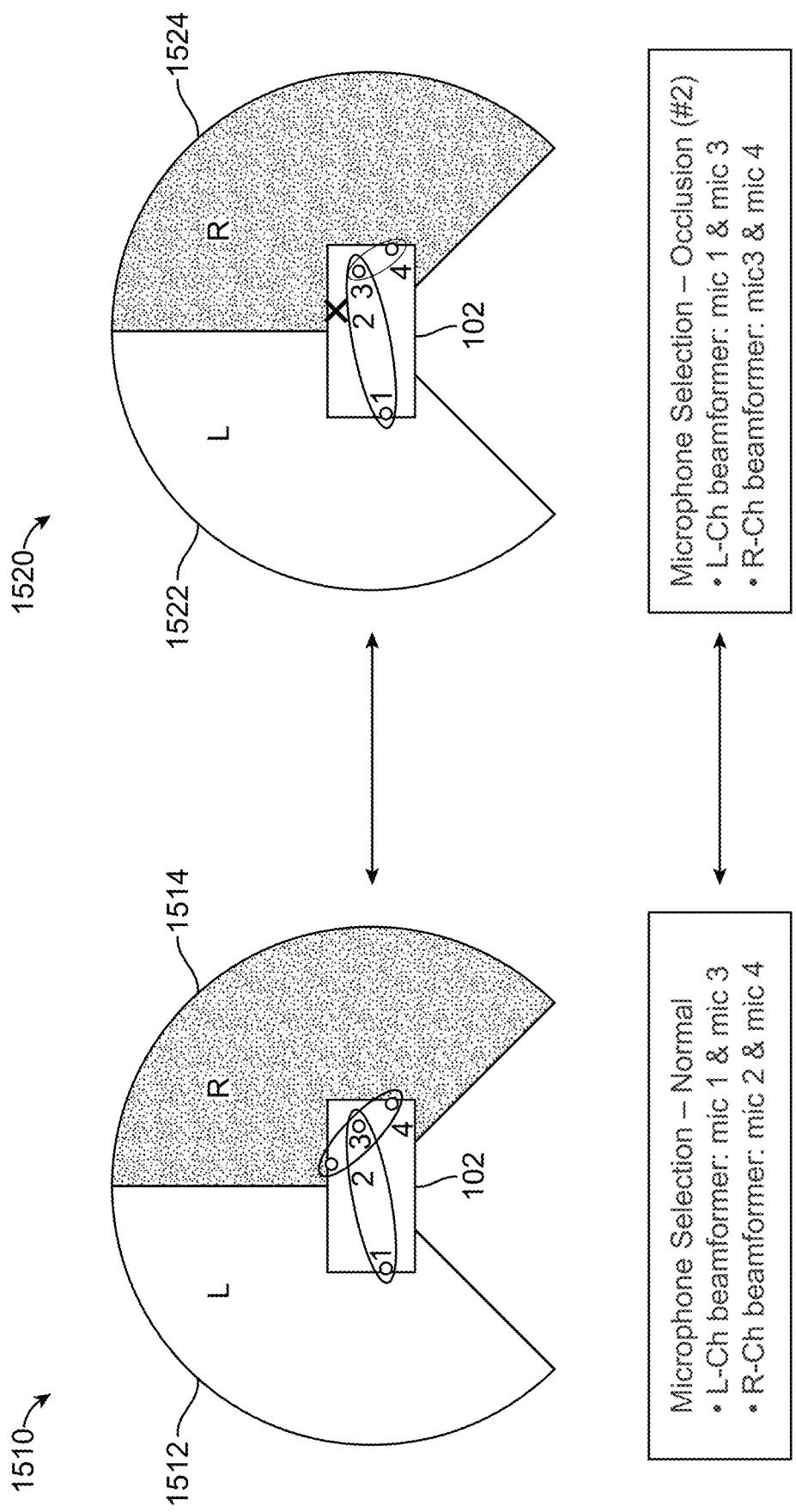
FIG. 15 is a diagram illustrating an example of spatial filter selection associated with non-occluded microphone input signals and restored spatial filter selection associated with occluded and non-occluded microphone input signals, in accordance with some examples.

FIG. 15 is a diagram illustrating an example of spatial filter selection associated with a set of non-occluded microphone audio frames and an example of spatial filter selection associated with a combination of occluded and non-occluded microphone audio frames. For example, a non-occluded spatial filter selection 1510 can be performed to generate a left channel beamformer 1512 and a right channel beamformer 1514, using as input audio frames captured by four non-occluded microphones (e.g., mic 1, mic 2, mic 3, mic 4). In some aspects, when all four microphone inputs are available for selecting a spatial filter for generating the left and right beamformer outputs 1512, 1514, the left beamformer output 1512 may be generated based on the input audio frames captured by mic 1 and the input audio frames captured by mic 3. The right beamformer output 1514 may be generated based on the input audio frames captured by mic 2 and mic 4.

If one of the four microphone inputs becomes occluded, a restored spatial filter selection 1520 can be performed to generate a restored left channel beamformer 1522 and a restored right channel beamformer 1524. For example, if an occlusion is detected for mic 2, the right channel beamformer 1514 may no longer be accurately generated (e.g., because right channel beamformer 1514 is generated based on using non-occluded audio frames captured by mic 2 and mic 4). The left channel 1512 is not generated based on audio frames captured by mic 2, so in some examples, the restored left channel beamformer 1522 and the non-occluded left channel beamformer 1512 can be the same.

A restored right channel beamformer 1524 can be generated to recreate the right channel beamformer 1514 that was previously generated using the now occluded mic 2 audio frames. For example, the spatial apparatus selection engine 640 illustrated in FIG. 6 and FIG. 8, the spatial apparatus selection engine 940 illustrated in FIG. 9, and/or the spatial apparatus selection engine 1040 illustrated in FIG. 10 can be used to select a best available or optimal spatial filter (e.g., beamformer) given the set of available non-occluded microphones (e.g., mic1, mic 3, and mic 4). In one illustrative example, the spatial selection apparatus can select or otherwise determine a spatial filter or beamformer for generating the reconstructed right channel 1524 using the non-occluded audio frames captured by mic 3 and mic 4. In some aspects, the spatial selection apparatus can provide a bank of beamformer coefficients for generating the reconstructed right channel beamformer 1524 to a selective spatial filtering engine such as the selective spatial filtering engine 650 illustrated in FIG. 6 and FIG. 11, the spatial filtering engine 1250 illustrated in FIG. 12, and/or the selective spatial filtering engine 1350 illustrated in FIG. 13. Based on the spatial filter(s) and or beamformer(s) determined by the spatial apparatus selection engine(s) described herein, the selective spatial filtering engine(s) described herein can generate reconstructed channel signals for one or more occluded channels or beamformers. Based on the reconstructed channel signals, the systems and techniques can generate a restored spatial audio output that maintains spatial sense when one or more microphones or input audio channels are occluded.

Figure 16:
FIG. 16 is a flow diagram illustrating an example of a process for audio signal processing, in accordance with some examples.

FIG. 16 is a flowchart diagram illustrating an example of a process 1600 for audio signal processing. At block 1602, the process 1600 includes detecting an occlusion of one or more microphones associated with at least one audio frame of one or more audio frames associated with a spatial audio record. For example, an occlusion can be detected for at least one audio frame of one or more audio frames associated with a spatial audio record generated using a multi-microphone device, such as the multi-microphone device 102 illustrated in FIG. 1. In some cases, detecting the occlusion for the at least one audio frame can be based on a channel map indicative of a quantity of microphones that are blocked or rubbed. For example, the microphones can include one or more of the microphones 104*a-e* included on the multi-microphone device 102 illustrated in FIG. 1 (also illustrated in FIGS. 2 and 3).

In some examples, detecting an occlusion for at least one audio frame comprises detecting an occlusion of a microphone associated with capturing the at least one audio frame. For example, an occlusion can be detected for one or more (or all) of the microphones 104*a-e* illustrated in FIGS. 1-3. In some examples, each audio frame included in the one or more audio frames may be obtained using a different one of the microphones. Each of the different microphones can be included on a same device (e.g., such as multi-microphone device 102 illustrated in FIG. 1, multi-microphone device 402 illustrated in FIG. 4, etc.). In some cases, the spatial audio record can be a stereo audio record that includes a first audio channel associated with at least a first microphone and a second audio channel associated with at least a second microphone. In some examples, the first microphone can be included on a first earpiece and the second microphone can be included on a second earpiece associated with the first earpiece.

In some examples, the occlusion of the microphone can be a rubbing occlusion or a blocking occlusion. For example, the occlusion of the microphone can be detected using an occlusion detection engine that is the same as or similar to the occlusion detection engine 620 illustrated in FIG. 6 and FIG. 7. In some cases, a rubbing occlusion can be detected using a rubbing detection engine that is the same as or similar to the rubbing detection engine 740 illustrated in FIG. 7. A blocking occlusion can be detected using a blocking detection engine that is the same as or similar to the blocking detection engine 750 illustrated in FIG. 7. In some cases, detecting an occlusion can include generating an occlusion flag that is the same as or similar to the occlusion flag 775 illustrated in FIGS. 7-13. In some cases, occlusion detection can be performed for each audio channel of a multi-channel audio input (e.g., such as the multi-channel audio input 610 illustrated in FIGS. 6 and 7).

In some examples, the one or more audio frames can be transmitted to a delayed audio database. For example, the one or more audio frames can be transmitted to delayed audio database 630 illustrated in FIG. 6 and FIGS. 8-13. The one or more audio frames can be written to the delayed audio database after a pre-determined delay has elapsed. The pre-determined delay can be the same as or similar to the delay period associated with delay filter $z^{-m}$ 615 illustrated in FIG. 6.

At block 1604, the process 1600 includes selecting, based on the detection of the occlusion, at least one of an occluded spatial filter for the one or more audio frames or a non-occluded spatial filter for the one or more audio frames. For example, in some cases, the process 1600 can select the occluded spatial filter for filtering the one or more audio frames and can select the non-occluded spatial filter for filtering the one or more audio frames. In some examples, the process 1600 can select the occluded spatial filter for performing occluded spatial filtering of the one or more audio frames and can select the non-occluded spatial filter for performing non-occluded spatial filtering of the one or more audio frames. For example, the selective switching can be performed using a selective spatial filtering engine that is the same as or similar to the selective spatial filtering engine 650 illustrated in FIG. 6 and FIG. 11, the 2-channel selective spatial filtering engine 1250 illustrated in FIG. 12, and/or the 3+channel selective spatial filtering engine 1350 illustrated in FIG. 13.

In some examples, performing occluded spatial filtering of the one or more audio frames includes determining an estimated direction of arrival (DOA) associated with an occluded microphone used to obtain the at least one audio frame associated with the occlusion. The occluded microphone can be associated with or identified based on an occlusion flag, such as the occlusion flag 775 determined using the occlusion detection engine 620 illustrated in FIGS. 6 and 7. In some cases, a spatial filter can be determined for generating a reconstructed signal for the occluded microphone, and occluded spatial filtering can be performed using the determined spatial filter.

For example, the spatial filter for generating the reconstructed signal for the occluded microphone can be determined using a spatial apparatus selection engine that is the same as or similar to the spatial apparatus selection engine 640 illustrated in FIGS. 6 and 8, the 2-channel spatial apparatus selection engine 940 illustrated in FIG. 9, and/or the 3+channel spatial apparatus selection engine 1040 illustrated in FIG. 10. In some examples, the determined spatial filter can be used to perform occluded spatial filtering using an occluded spatial audio processing path included in a selective spatial filtering engine (e.g., the same as or similar to the selective spatial filtering engine 650 illustrated in FIG. 6 and FIG. 11, the 2-channel selective spatial filtering engine 1250 illustrated in FIG. 12, and/or the 3+channel selective spatial filtering engine 1350 illustrated in FIG. 13).

In some examples, performing occluded spatial filtering using the spatial filter can be based on one or more non-occluded audio frames included in the one or more audio frames, wherein an occlusion is not detected for the one or more non-occluded audio frames. For example, the one or more non-occluded audio frames may be associated with a different value of the occlusion flag 775 than the one or more occluded audio frames. In some cases, the one or more non-occluded audio frames may not be associated with the occlusion flag 775 and the one or more occluded audio frames may each be associated with the occlusion flag 775.

In some cases, selectively switching, during the spatial recording, between performing occluded spatial filtering of the one or more audio frames and performing non-occluded spatial filtering of the one or more audio frames can include obtaining, after a pre-determined delay has elapsed, one or more audio frames and a corresponding one or more delayed audio frames from a delayed audio database (e.g., such as delayed audio database 630 illustrated in FIGS. 6-13). In some cases, the selectively switching can include crossfading between performing occluded spatial filtering of the one or more delayed audio frames and performing non-occluded spatial filtering of the one or more audio frames.

In some examples, an output signal generated based on performing the occluded spatial filtering can be merged with an output signal generated based on performing the non-occluded spatial filtering. For example, a smart merging engine that is the same as or similar to the smart merging engine 1160 illustrated in FIG. 11 can be used to merge an occluded spatial filtering output signal (e.g., generated by the occluded spatial filtering 1134) and a non-occluded spatial filtering output signal (e.g., generated by the non-occluded spatial filtering 1124). In some examples, the merging can be performed based at least in part on a channel map associated with obtaining the one or more audio frames. For example, the channel map information can be obtained or otherwise included in the fourth condition 1174 information illustrated in FIG. 11 as being provided as an input to smart merging engine 1160.

In some examples, the process 1600 can further include removing a rubbing effect detected in the one or more audio frames associated with the spatial audio recording. In some examples, the process 1600 can further include removing a scratching effect detected in the one or more audio frames associated with the spatial audio recording. In some cases, the spatial audio recording may be a stereo audio recording that includes a first audio channel associated with at least a first microphone and a second audio channel associated with at least a second microphone. In some examples, the first microphone can be included on a first earpiece and the second microphone can be included on a second earpiece that is associated with the first earpiece. In some examples, the selective switching can be performed between at least the first microphone included on the first earpiece and the second microphone include on the second earpiece, based on detecting an occlusion in one of the two microphones or earpieces.

In some examples, a stereo audio recording can be reconstructed by performing a time shift between the first microphone and the second microphone, based on detecting the occlusion. In some examples, the stereo audio recording can be reconstructed by performing a coloration shift between a first mono audio signal captured by the first microphone and a second mono audio signal captured by the second microphone, based on detecting the occlusion. In some cases, the coloration shift can be determined based on geometry information associated with the first microphone and the second microphone. In some examples, the first microphone and the second microphone can be included on a camcorder associated with the spatial audio recording, and the selective switching can be performed between the first microphone and the second microphone based on detecting the occlusion.

In some examples, the processes described herein (e.g., process 1600 and/or other process described herein) may be performed by a computing device or apparatus. In one example, the process 1600 may be performed by a wireless communication device. In one example, the process 1600 may be performed by a multi-microphone device (e.g., such as device 102 illustrated in FIG. 1) and/or other audio playback devices. In another example, the process 1600 may be performed by a computing device with the computing system architecture 1700 shown in FIG. 17. For instance, a wireless communication device with the computing architecture shown in FIG. 17 may include the components of the multi-microphone device 102 and/or other audio playback devices and may implement the operations of process 1600.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1600 is illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1600 and/or other processes described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 17:
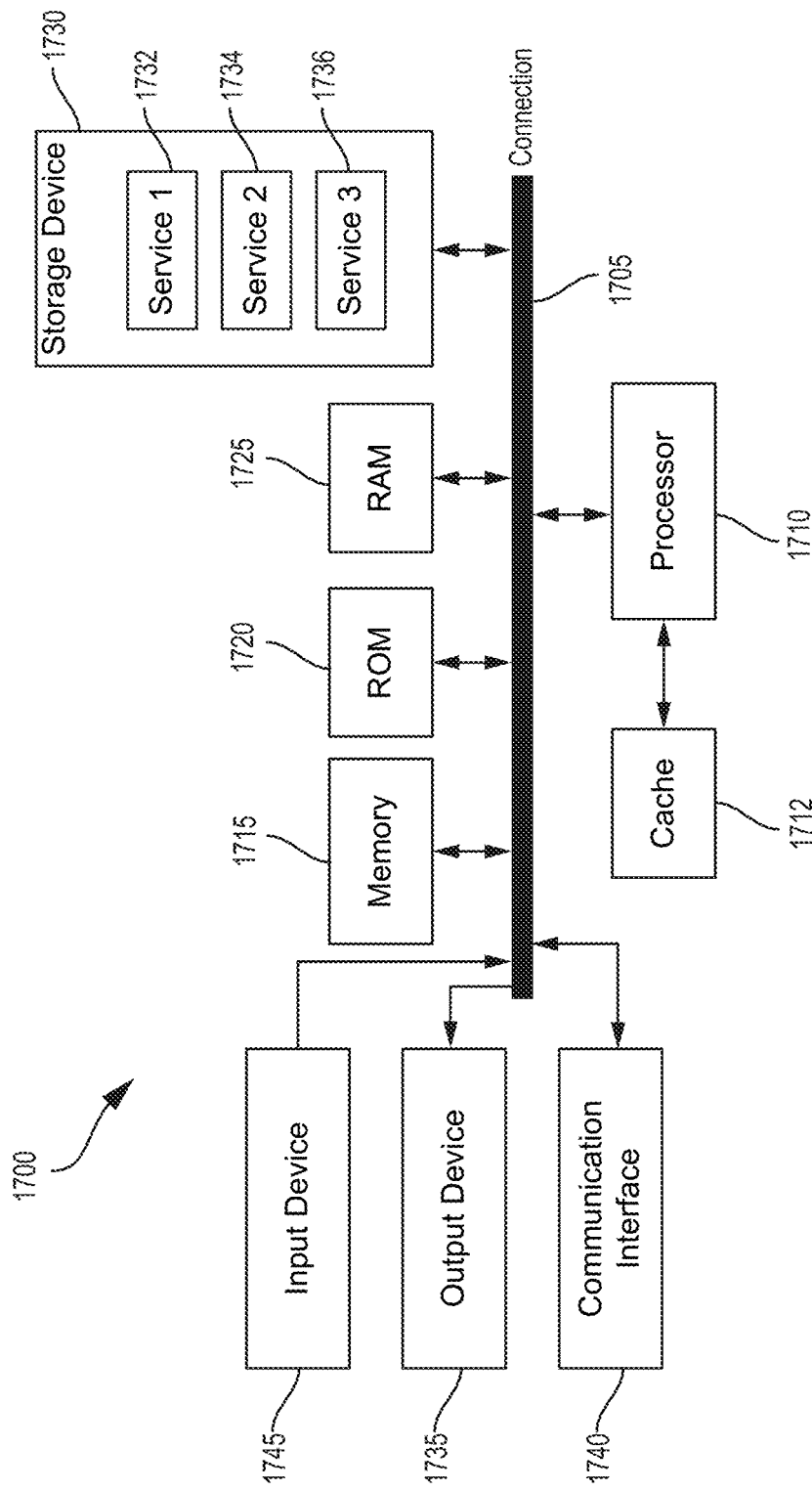
FIG. 17 is a block diagram illustrating an example of a computing system, in accordance with some examples.

FIG. 17 is a diagram illustrating an example of a system for implementing certain aspects of the present technology. In particular, FIG. 17 illustrates an example of computing system 1700, which may be for example any computing device making up internal computing system, a remote computing system, a camera, or any component thereof in which the components of the system are in communication with each other using connection 1705. Connection 1705 may be a physical connection using a bus, or a direct connection into processor 1710, such as in a chipset architecture. Connection 1705 may also be a virtual connection, networked connection, or logical connection.

In some aspects, computing system 1700 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1700 includes at least one processing unit (CPU or processor) 1710 and connection 1705 that communicatively couples various system components including system memory 1715, such as read-only memory (ROM) 1720 and random-access memory (RAM) 1725 to processor 1710. Computing system 1700 may include a cache 1714 of high-speed memory connected directly with, in close proximity to, or integrated as part of processor 1710.

Processor 1710 may include any general-purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which may represent any number of input mechanisms, such as a microphone for speech, a touch-sensitive screen for gesture or graphical input, keyboard, mouse, motion input, speech, etc. Computing system 1700 may also include output device 1735, which may be one or more of a number of output mechanisms. In some instances, multimodal systems may enable a user to provide multiple types of input/output to communicate with computing system 1700.

Computing system 1700 may include communications interface 1740, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth wireless signal transfer, a Bluetooth low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1740 may also include one or more Global Navigation Satellite System (GNSS) receivers or transceivers that are used to determine a location of the computing system 1700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1730 may include software services, servers, services, etc., that when the code that defines such software is executed by the processor 1710, it causes the system to perform a function. In some aspects, a hardware service that performs a particular function may include the software component stored in a computer-readable medium in connection with the necessary hardware components, such as processor 1710, connection 1705, output device 1735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to (" ") and greater than or equal to (" ") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative Examples of the Disclosure Include

Aspect 1. An apparatus to generate a spatial audio record, the apparatus comprising: a memory; and one or more processors coupled to the memory, the one or more processors configured to: detect an occlusion of one or more microphones associated with at least one audio frame of one or more audio frames associated with the spatial audio record; and selectively switch between, based on the detection of the occlusion, an occluded spatial filter for the one or more audio frames and a non-occluded spatial filter for the one or more audio frames.

Aspect 2. The apparatus of Aspect 1, wherein the one or more processors are configured to detect the occlusion of the one or more microphones based on a channel map indicative of a quantity of microphones that are blocked or rubbed.

Aspect 3. The apparatus of any of Aspects 1 to 2, wherein the one or more processors are further configured to: transmit, at a first time, the one or more audio frames to a delayed audio database, wherein the one or more audio frames are written to the delayed audio database after a pre-determined delay has elapsed.

Aspect 4. The apparatus of Aspect 3, wherein the one or more processors are further configured to: obtain, at a second time, the one or more audio frames from the delayed audio database, the second time being later than the first time; and select at least one of the occluded spatial filter or the non-occluded spatial filter based on obtaining the one or more audio frames at the second time.

Aspect 5. The apparatus of Aspect 4, wherein to select at least one of the occluded spatial filter or the non-occluded spatial filter, the one or more processors are configured to: crossfade between the occluded spatial filter and the non-occluded spatial filter, wherein the occluded spatial filter operates on the one or more audio frames obtained from the delayed audio database at the second time, and wherein the non-occluded spatial filter operates on the one or more audio frames obtained from the delayed audio database at the second time.

Aspect 6. The apparatus of any of Aspects 1 to 5, wherein the one or more processors are configured to: determine an estimated direction of arrival (DOA) associated with an occluded microphone used to obtain the at least one audio frame associated with the occlusion; determine a spatial filter to generate a reconstructed signal for the occluded microphone; and use the determined spatial filter as the occluded spatial filter.

Aspect 7. The apparatus of Aspect 6, wherein the one or more processors are configured to use the determined spatial filter as the occluded spatial filter for one or more non-occluded audio frames included in the one or more audio frames, wherein an occlusion is not detected for the one or more non-occluded audio frames.

Aspect 8. The apparatus of any of Aspects 1 to 7, wherein the occluded spatial filter includes one or more filter banks.

Aspect 9. The apparatus of Aspect 8, wherein the one or more filter banks are configured to receive as input one or more non-occluded audio frames included in the one or more audio frames, and wherein an occlusion is not detected for the one or more non-occluded audio frames.

Aspect 10. The apparatus of any of Aspects 8 to 9, wherein the one or more processors are configured to: select at least one filter bank from the one or more filter banks included in the occluded spatial filter, wherein the selected at least one filter bank is associated with one or more non-occluded microphones.

Aspect 11. The apparatus of any of Aspects to 10, wherein the non-occluded spatial filter includes one or more filter banks.

Aspect 12. The apparatus of any of Aspects 1 to 11, wherein to detect an occlusion for at least one audio frame, the one or more processors are configured to detect an occlusion of a microphone associated with capturing the at least one audio frame.

Aspect 13. The apparatus of Aspect 12, wherein the occlusion of the microphone comprises a rubbing occlusion or a blocking occlusion.

Aspect 14. The apparatus of any of Aspects 1 to 13, wherein the one or more processors are configured to obtain each audio frame included in the one or more audio frames using a different microphone.

Aspect 15. The apparatus of Aspect 14, wherein each different microphone is included on a same device.

Aspect 16. The apparatus of any of Aspects 1 to 15, wherein the one or more processors are further configured to merge, based on a channel map associated with obtaining the one or more audio frames, an output signal generated based on performing the occluded spatial filtering and an output signal generated based on performing the non-occluded spatial filtering.

Aspect 17. The apparatus of any of Aspects 1 to 16, wherein the one or more processors are further configured to remove a rubbing effect detected in the one or more audio frames associated with the spatial audio recording.

Aspect 18. The apparatus of any of Aspects 1 to 17, wherein the one or more processors are further configured to remove a scratching effect detected in the one or more audio frames associated with the spatial audio recording.

Aspect 19. The apparatus of any of Aspects 1 to 18, wherein the spatial audio recording is a stereo audio recording including a first audio channel associated with at least a first microphone and a second audio channel associated with at least a second microphone.

Aspect 20. The apparatus of Aspect 19, wherein the first microphone is included on a first earpiece and the second microphone is included on a second earpiece associated with the first earpiece.

Aspect 21. The apparatus of Aspect 20, wherein the one or more processors are further configured to selectively switch between at least the first microphone included on the first earpiece and the second microphone included on the second earpiece based on detecting an occlusion Aspect 22. The apparatus of any of Aspects 19 to 21, wherein the one or more processors are further configured to reconstruct the stereo audio recording by performing a time shift between the first microphone and the second microphone based on detecting the occlusion.

Aspect 23. The apparatus of any of Aspects 19 to 22, wherein the one or more processors are further configured to reconstruct the stereo audio recording by performing a coloration shift between a first mono audio signal captured by the first microphone and a second mono audio signal captured by the second microphone based on detecting the occlusion.

Aspect 24. The apparatus of Aspect 23, wherein the one or more processors are configured to determine the coloration shift based on geometry information associated with the first microphone and the second microphone.

Aspect 25. The apparatus of any of Aspects 19 to 24, wherein: the first microphone and the second microphone are included on a camcorder associated with the spatial audio recording; and the selectively switching is performed between the first microphone and the second microphone based on detecting the occlusion.

Aspect 26. A method of performing spatial audio recording, comprising: detecting an occlusion for at least one audio frame of one or more audio frames associated with a spatial audio recording; and during the spatial audio recording, selectively switching between performing occluded spatial filtering of the one or more audio frames and non-occluded spatial filtering of the one or more audio frames based on detecting the occlusion for the at least one audio frame.

Aspect 27. The method of Aspect 26, wherein detecting the occlusion for the at least one audio frame is based on a channel map indicative of a quantity of microphones that are blocked or rubbed.

Aspect 28. The method of any of Aspects 26 to 27, further comprising: transmitting the one or more audio frames to a delayed audio database, wherein the one or more audio frames are written to the delayed audio database after a pre-determined delay has elapsed.

Aspect 29. The method of Aspect 28, further comprising: obtaining, after the pre-determined delay has elapsed, the one or more audio frames and a corresponding one or more delayed audio frames from the delayed audio database, wherein the selectively switching is performed based on obtaining the one or more audio frames and the corresponding one or more delayed audio frames from the delayed audio database.

Aspect 30. The method of Aspect 29, wherein the selectively switching includes: crossfading between performing occluded spatial filtering of the one or more delayed audio frames and performing non-occluded spatial filtering of the one or more audio frames.

Aspect 31. The method of any of Aspects 26 to 30, wherein performing occluded spatial filtering of the one or more audio frames includes: determining an estimated direction of arrival (DOA) associated with an occluded microphone used to obtain the at least one audio frame associated with the occlusion; determining a spatial filter for generating a reconstructed signal for the occluded microphone; and performing occluded spatial filtering using the spatial filter.

Aspect 32. The method of Aspect 31, wherein performing occluded spatial filtering using the spatial filter is based on one or more non-occluded audio frames included in the one or more audio frames, wherein an occlusion is not detected for the one or more non-occluded audio frames.

Aspect 33. The method of any of Aspects 26 to 32, wherein detecting an occlusion for at least one audio frame comprises detecting an occlusion of a microphone associated with capturing the at least one audio frame.

Aspect 34. The method of Aspect 33, wherein the occlusion of the microphone comprises a rubbing occlusion or a blocking occlusion.

Aspect 35. The method of any of Aspects 26 to 34, wherein each audio frame included in the one or more audio frames is obtained using a different microphone.

Aspect 36. The method of Aspect 35, wherein each different microphone is included on a same device.

Aspect 37. The method of any of Aspects 26 to 36, further comprising merging, based on a channel map associated with obtaining the one or more audio frames, an output signal generated based on performing the occluded spatial filtering and an output signal generated based on performing the non-occluded spatial filtering.

Aspect 38. The method of any of Aspects 26 to 37, further comprising removing a rubbing effect detected in the one or more audio frames associated with the spatial audio recording.

Aspect 39. The method of any of Aspects 26 to 37, further comprising removing a scratching effect detected in the one or more audio frames associated with the spatial audio recording.

Aspect 40. The method of any of Aspects 26 to 39, wherein the spatial audio recording is a stereo audio recording including a first audio channel associated with at least a first microphone and a second audio channel associated with at least a second microphone.

Aspect 41. The method of Aspect 40, wherein the first microphone is included on a first earpiece and the second microphone is included on a second earpiece associated with the first earpiece.

Aspect 42. The method of Aspect 41, further comprising selectively switching between at least the first microphone included on the first earpiece and the second microphone included on the second earpiece based on detecting an occlusion.

Aspect 43. The method of any of Aspects 40 to 42, further comprising reconstructing the stereo audio recording by performing a time shift between the first microphone and the second microphone based on detecting the occlusion.

Aspect 44. The method of any of Aspects 40 to 43, further comprising reconstructing the stereo audio recording by performing a coloration shift between a first mono audio signal captured by the first microphone and a second mono audio signal captured by the second microphone based on detecting the occlusion.

Aspect 45. The method of Aspect 44, wherein the coloration shift is determined based on geometry information associated with the first microphone and the second microphone.

Aspect 46. The method of any of Aspects 40 to 45, wherein: the first microphone and the second microphone are included on a camcorder associated with the spatial audio recording; and the selectively switching is performed between the first microphone and the second microphone based on detecting the occlusion.

Aspect 47. A non-transitory computer-readable medium having stored thereon instructions that, when executed by one or more processors, cause the one or more processors to: detect an occlusion for at least one audio frame of one or more audio frames associated with a spatial audio recording; and during the spatial audio recording, selectively switch between performing occluded spatial filtering of the one or more audio frames and non-occluded spatial filtering of the one or more audio frames based on detecting the occlusion for the at least one audio frame.

Aspect 48. The non-transitory computer-readable medium of Aspect 47, wherein the instructions cause the one or more processors to detect the occlusion for the at least one audio frame based on a channel map indicative of a quantity of microphones that are blocked or rubbed.

Aspect 49. The non-transitory computer-readable medium of any of Aspects 47 to 48, wherein the instructions further cause the one or more processors to: transmit the one or more audio frames to a delayed audio database, wherein the one or more audio frames are written to the delayed audio database after a pre-determined delay has elapsed.

Aspect 50. The non-transitory computer-readable medium of Aspect 49, wherein the instructions further cause the one or more processors to: obtain, after the pre-determined delay has elapsed, the one or more audio frames and a corresponding one or more delayed audio frames from the delayed audio database, wherein the selectively switching is performed based on obtaining the one or more audio frames and the corresponding one or more delayed audio frames from the delayed audio database.

Aspect 51. The non-transitory computer-readable medium of Aspect 50, wherein to selectively switch, the instructions cause the one or more processors to: crossfade between performing occluded spatial filtering of the one or more delayed audio frames and performing non-occluded spatial filtering of the one or more audio frames.

Aspect 52. The non-transitory computer-readable medium of any of Aspects 47 to 51, wherein to perform occluded spatial filtering of the one or more audio frames, the instructions cause the one or more processors to: determine an estimated direction of arrival (DOA) associated with an occluded microphone used to obtain the at least one audio frame associated with the occlusion; determine a spatial filter for generating a reconstructed signal for the occluded microphone; and perform occluded spatial filtering using the spatial filter.

Aspect 53. The non-transitory computer-readable medium of Aspect 52, wherein the instructions cause the one or more processors to perform occluded spatial filtering using the spatial filter based on one or more non-occluded audio frames included in the one or more audio frames, wherein an occlusion is not detected for the one or more non-occluded audio frames.

Aspect 54. The non-transitory computer-readable medium of any of Aspects 47 to 53, wherein to detect an occlusion for at least one audio frame, the instructions cause the one or more processors to detect an occlusion of a microphone associated with capturing the at least one audio frame.

Aspect 55. The non-transitory computer-readable medium of Aspect 54, wherein the occlusion of the microphone comprises a rubbing occlusion or a blocking occlusion.

Aspect 56. The non-transitory computer-readable medium of any of Aspects 47 to 55, wherein the instructions cause the one or more processors to obtain each audio frame included in the one or more audio frames using a different microphone.

Aspect 57. The non-transitory computer-readable medium of Aspect 56, wherein each different microphone is included on a same device.

Aspect 58. The non-transitory computer-readable medium of any of Aspects 47 to 57, wherein the instructions further cause the one or more processors to merge, based on a channel map associated with obtaining the one or more audio frames, an output signal generated based on performing the occluded spatial filtering and an output signal generated based on performing the non-occluded spatial filtering.

Aspect 59. The non-transitory computer-readable medium of any of Aspects 47 to 58, wherein the instructions further cause the one or more processors to remove a rubbing effect detected in the one or more audio frames associated with the spatial audio recording.

Aspect 60. The non-transitory computer-readable medium of any of Aspects 47 to 59, wherein the instructions further cause the one or more processors to remove a scratching effect detected in the one or more audio frames associated with the spatial audio recording.

Aspect 61. The non-transitory computer-readable medium of any of Aspects 47 to 60, wherein the spatial audio recording is a stereo audio recording including a first audio channel associated with at least a first microphone and a second audio channel associated with at least a second microphone.

Aspect 62. The non-transitory computer-readable medium of Aspect 61, wherein the first microphone is included on a first earpiece and the second microphone is included on a second earpiece associated with the first earpiece.

Aspect 63. The non-transitory computer-readable medium of Aspect 62, wherein the instructions further cause the one or more processors to selectively switch between at least the first microphone included on the first earpiece and the second microphone included on the second earpiece based on detecting an occlusion.

Aspect 64. The non-transitory computer-readable medium of any of Aspects 61 to 63, wherein the instructions further cause the one or more processors to reconstruct the stereo audio recording by performing a time shift between the first microphone and the second microphone based on detecting the occlusion.

Aspect 65. The non-transitory computer-readable medium of any of Aspects 61 to 64, wherein the instructions further cause the one or more processors to reconstruct the stereo audio recording by performing a coloration shift between a first mono audio signal captured by the first microphone and a second mono audio signal captured by the second microphone based on detecting the occlusion.

Aspect 66. The non-transitory computer-readable medium of Aspect 65, wherein the instructions cause the one or more processors to determine the coloration shift based on geometry information associated with the first microphone and the second microphone.

Aspect 67. The non-transitory computer-readable medium of any of Aspects 61 to 66, wherein: the first microphone and the second microphone are included on a camcorder associated with the spatial audio recording; and the selectively switching is performed between the first microphone and the second microphone based on detecting the occlusion.

Aspect 68. An apparatus comprising means for performing any of the operations of Aspects 1 to 25.

Aspect 69. An apparatus comprising means for performing any of the operations of Aspects 26 to 46.

Aspect 70. An apparatus comprising means for performing any of the operations of Aspects 47 to 67.

Aspect 71. A non-transitory computer-readable storage medium having stored thereon instructions which, when executed by one or more processors, cause the one or more processors to perform any of the operations of Aspects 1 to 25.

Aspect 72. A non-transitory computer-readable storage medium having stored thereon instructions which, when executed by one or more processors, cause the one or more processors to perform any of the operations of Aspects 26 to 46.

Aspect 73. A non-transitory computer-readable storage medium having stored thereon instructions which, when executed by one or more processors, cause the one or more processors to perform any of the operations of Aspects 47 to 67.

Aspect 74. An apparatus to generate a spatial audio output, the apparatus comprising: a memory; and one or more processors coupled to the memory, the one or more processors configured to: receive signals from a plurality of microphones comprising one or more audio frames; generate the spatial audio output from the signals from the one or more microphones using a first spatial filter; detect an occlusion of one or more microphones of the plurality of microphones; and selectively switch between, based on the detection of the occlusion, using the first spatial filter for the one or more audio frames and using a second spatial filter for the one or more audio frames.

What is claimed is:

1. A system, that includes a first earpiece that includes one or more microphones and a second earpiece that includes one or more microphones, comprising:
   a memory; and
   one or more processors coupled to the memory, the one or more processors configured to:
   generate a spatial audio record;
   detect an occlusion of a first microphone of the one or more microphones on the first earpiece or a second microphone of the one or more microphones on the second earpiece associated with at least one audio frame of one or more audio frames associated with the spatial audio record, wherein the spatial audio record is a stereo audio record that includes a first audio channel associated with the first microphone and a second audio channel associated with the second microphone; and
      select, based on the detection of the occlusion, at least one of an occluded spatial filter for the one or more audio frames or a non-occluded spatial filter for the one or more audio frames; and
      select, the first microphone included on the first earpiece based or the second microphone included on the second earpiece, based on the detection of the occlusion.

2. The system of claim 1, wherein the one or more processors are configured to detect the occlusion of the first microphone or the second microphone based on a channel map indicative of a quantity of microphones of the one or more microphones in the first earpiece or the one or more microphones in the second earpiece that are blocked or rubbed.

3. The system of claim 1, wherein the one or more processors are further configured to:
   transmit, at a first time, the one or more audio frames to a delayed audio database, wherein the one or more audio frames are written to the delayed audio database after a pre-determined delay has elapsed.

4. The system of claim 3, wherein the one or more processors are further configured to:
obtain, at a second time, the one or more audio frames from the delayed audio database, the second time being later than the first time; and
select at least one of the occluded spatial filter or the non-occluded spatial filter based on the obtained of the one or more audio frames at the second time.

5. The system of claim 4, wherein to select at least one of the occluded spatial filter or the non-occluded spatial filter, the one or more processors are configured to:
crossfade between the occluded spatial filter and the non-occluded spatial filter, wherein the occluded spatial filter operates on the one or more audio frames obtained from the delayed audio database at the second time, and wherein the non-occluded spatial filter operates on the one or more audio frames obtained from the delayed audio database at the second time.

6. The system of claim 1, wherein the one or more processors are configured to:
determine an estimated direction of arrival (DOA) associated with an occluded microphone used to obtain the at least one audio frame associated with the occlusion;
determine a spatial filter to generate a reconstructed signal for the occluded microphone; and
use the determined spatial filter as the occluded spatial filter.

7. The system of claim 6, wherein the one or more processors are configured to use the determined spatial filter as the occluded spatial filter for one or more non-occluded audio frames included in the one or more audio frames, wherein an the occlusion is not detected for the one or more non-occluded audio frames.

8. The system of claim 1, wherein the occluded spatial filter includes one or more filter banks.

9. The system of claim 8, wherein the one or more filter banks are configured to receive as input one or more non-occluded audio frames included in the one or more audio frames, and wherein an occlusion is not detected for the one or more non-occluded audio frames.

10. The system of claim 8, wherein the one or more processors are configured to:
select at least one filter bank from the one or more filter banks included in the occluded spatial filter, wherein the selected at least one filter bank is associated with one or more non-occluded microphones.

11. The system of claim 1, wherein the non-occluded spatial filter includes one or more filter banks.

12. The system of claim 1, wherein to detect an occlusion of the first microphone or the second microphone associated with the at least one audio frame, the one or more processors are configured to detect the occlusion of the first microphone or the second microphone used to capture the at least one audio frame.

13. The system of claim 12, wherein the occlusion of the first microphone or the second microphone comprises a rubbing occlusion or a blocking occlusion.

14. The system of claim 1, wherein the one or more processors are configured to obtain each audio frame included in the one or more audio frames using a different microphone than the first microphone or the second microphone.

15. The system of claim 14, wherein the first microphone and the second microphone are included on a same device.

16. The system of claim 1, wherein the one or more processors are further configured to merge, based on a channel map associated with the first microphone or the second microphone, an output signal generated based on the occluded spatial filter for the one or more audio frames and an output signal generated based the non-occluded spatial filter for the one or more audio frames.

17. The system s of claim 1, wherein the one or more processors are further configured to remove a rubbing effect detected in the one or more audio frames associated with the spatial audio record.

18. The system of claim 1, wherein the one or more processors are further configured to remove a scratching effect detected in the one or more audio frames associated with the spatial audio record.

19. The system of claim 1, wherein the one or more processors are further configured to reconstruct the stereo audio record based on a time shift between the first microphone and the second microphone, wherein the time shift is determined based on the detection of the occlusion.

20. The system of claim 1, wherein the one or more processors are further configured to reconstruct the stereo audio record based on a coloration shift between a first mono audio signal captured by the first microphone and a second mono audio signal captured by the second microphone, wherein the coloration shift is determined based on the detection of the occlusion.

21. The system of claim 20, wherein the one or more processors are configured to determine the coloration shift based on geometry information associated with the first microphone and the second microphone.

22. The system of claim 1, wherein:
the first microphone and the second microphone are included on part of a device that performs a camcorder function associated with the spatial audio record.

23. A method comprising:
performing a spatial audio recording;
detecting an occlusion, a first microphone of the one or more microphones on a first earpiece or a second microphone of the one or more microphones on a second earpiece, for at least one audio frame of one or more audio frames associated with a spatial audio recording, wherein the spatial audio recording is a stereo audio recording including a first audio channel associated with a first microphone and a second audio channel associated with a second microphone, wherein the at least first microphone is included on a first earpiece and the at least second microphone is included on a second earpiece associated with the first earpiece; and
during the spatial audio recording, selecting between performing at least one of occluded spatial filtering of the one or more audio frames or non-occluded spatial filtering of the one or more audio frames based on detecting the occlusion for the at least one audio frame; and
selecting the at least one of the first microphone included on the first earpiece or the at least second microphone included on the second earpiece based on detecting the occlusion.

24. The method of claim 23, wherein detecting the occlusion of the first microphone or the second for the at least one audio frame is based on a channel map indicative of the first microphone or the second microphone quantity of microphones of the one or more microphones in the first earpiece or the one or more microphones in the second earpiece that are blocked or rubbed.

25. The method of claim 23, further comprising:
transmitting, at a first time, the one or more audio frames to a delayed audio database, wherein the one or more audio frames are written to the delayed audio database after a pre- determined delay has elapsed.

26. The method of claim 25, further comprising:
obtaining, at a second time, the one or more audio frames from the delayed audio database, the second time being later than the first time,
wherein the selecting between performing at least one of occluded spatial filtering or non- occluded spatial filtering is based on obtaining the one or more audio frames from the delayed audio database at the second time.

27. The method of claim 26, wherein the selecting includes:
crossfading between performing occluded spatial filtering of the one or more audio frames obtained from the delayed audio database at the second time and performing non-occluded spatial filtering of the one or more audio frames obtained from the delayed audio database at the second time.

28. The method of claim 23, wherein performing occluded spatial filtering of the one or more audio frames includes:
determining an estimated direction of arrival (DOA) associated with an occluded microphone used to obtain the at least one audio frame associated with the occlusion;
determining a spatial filter for generating a reconstructed signal for the occluded microphone; and
performing occluded spatial filtering using the spatial filter.

29. The method of claim 28, wherein performing occluded spatial filtering using the spatial filter is based on one or more non-occluded audio frames included in the one or more audio frames, wherein an occlusion is not detected for the one or more non-occluded audio frames.

30. The method of claim 23, wherein detecting the occlusion comprises detecting an occlusion of the first microphone or the second microphone associated with capturing the at least one audio frame.

31. The method of claim 30, wherein the occlusion of the first microphone or the second microphone comprises a rubbing occlusion or a blocking occlusion.

32. The method of claim 23, wherein each audio frame included in the one or more audio frames is obtained using a different microphone than the first microphone or the second microphone.

33. The method of claim 32, wherein each different microphone, than the first microphone or the second microphone, is included on the same device.

34. The method of claim 23, further comprising merging, based on a channel map associated with obtaining the one or more audio frames, an output signal generated based on performing the occluded spatial filtering and an output signal generated based on performing the non-occluded spatial filtering.

35. The method of claim 23, further comprising removing a rubbing effect detected in the one or more audio frames associated with the spatial audio recording.

36. The method of claim 23, further comprising removing a scratching effect detected in the one or more audio frames associated with the spatial audio recording.

37. The method of claim 23, further comprising reconstructing the stereo audio recording by performing a time shift between the first microphone and the second microphone based on detecting the occlusion.

38. The method of claim 23, further comprising reconstructing the stereo audio recording by performing a coloration shift between a first mono audio signal captured by the first microphone and a second mono audio signal captured by the second microphone based on detecting the occlusion.

39. The method of claim 38, wherein the coloration shift is determined based on geometry information associated with the first microphone and the second microphone.

40. The method of claim 23, wherein:
the first microphone and the second microphone are included on a camcorder associated with the spatial audio recording; and
the selecting at least one of the first microphone or the second microphone is based on detecting the occlusion.

41. A non-transitory computer-readable medium having stored thereon instructions that, when executed by one or more processors, cause the one or more processors to:
generate a spatial audio recording;
detect an occlusion a first microphone of one or more microphones on a first earpiece or a second microphone of one or more microphones on a second earpiece for at least one audio frame of one or more audio frames associated with a spatial audio recording, wherein the spatial audio recording is a stereo audio recording that includes a first audio channel associated with the first microphone and a second audio channel associated with the second microphone;
select between performing at least one of occluded spatial filtering of the one or more audio frames or non-occluded spatial filtering of the one or more audio frames based on detection of the occlusion for the at least one audio frame; and
select, the first microphone included on the first earpiece based or the second microphone included on the second earpiece, based on the detection of the occlusion.

42. The non-transitory computer-readable medium of claim 41, wherein the instructions cause the one or more processors to detect the occlusion of the first microphone or the second microphone for the at least one audio frame based on a channel map indicative of a quantity of microphones of the one or more microphones in the first earpiece or the one or more microphones in the second earpiece that are blocked or rubbed.

43. The non-transitory computer-readable medium of claim 41, wherein the instructions further cause the one or more processors to:
transmit, at a first time, the one or more audio frames to a delayed audio database, wherein the one or more audio frames are written to the delayed audio database after a pre-determined delay has elapsed.

44. The non-transitory computer-readable medium of claim 43, wherein the instructions further cause the one or more processors to:
obtain, at a second time, the one or more audio frames from the delayed audio database, the second time being later than the first time; and
select between performing at least one of the occluded spatial filtering or the non-occluded spatial filtering based on obtaining the one or more audio frames from the delayed audio database at the second time.

45. The non-transitory computer-readable medium of claim 44, wherein to select between performing at least one of the occluded spatial filtering or the non-occluded spatial filtering, the instructions cause the one or more processors to:

crossfade between performing occluded spatial filtering of the one or more audio frames obtained from the delayed audio database at the second time and performing non-occluded spatial filtering of the one or more audio frames obtained from the delayed audio database at the second time.

46. The non-transitory computer-readable medium of claim 41, wherein to perform occluded spatial filtering of the one or more audio frames, the instructions cause the one or more processors to:
   determine an estimated direction of arrival (DOA) associated with an occluded microphone used to obtain the at least one audio frame associated with the occlusion;
   determine a spatial filter for generating a reconstructed signal for the occluded microphone; and
   perform occluded spatial filtering using the spatial filter.

47. The non-transitory computer-readable medium of claim 46, wherein the instructions cause the one or more processors to perform occluded spatial filtering using the spatial filter based on one or more non-occluded audio frames included in the one or more audio frames, wherein an occlusion is not detected for the one or more non-occluded audio frames.

48. The non-transitory computer-readable medium of claim 41, wherein to detect an occlusion for at least one audio frame, the instructions cause the one or more processors to detect an occlusion of a microphone associated with capturing the at least one audio frame.

49. The non-transitory computer-readable medium of claim 48, wherein the occlusion of the microphone comprises a rubbing occlusion or a blocking occlusion.

50. The non-transitory computer-readable medium of claim 41, wherein the instructions cause the one or more processors to obtain each audio frame included in the one or more audio frames using a different microphone than the first microphone or the second microphone.

51. The non-transitory computer-readable medium of claim 50, wherein each different microphone, than the first microphone or the second microphone, is included on a same device.

52. The non-transitory computer-readable medium of claim 41, wherein the instructions further cause the one or more processors to merge, based on a channel map associated with obtaining the one or more audio frames, an output signal generated based on performing the occluded spatial filtering and an output signal generated based on performing the non-occluded spatial filtering.

53. The non-transitory computer-readable medium of claim 41, wherein the instructions further cause the one or more processors to remove a rubbing effect detected in the one or more audio frames associated with the spatial audio recording.

54. The non-transitory computer-readable medium of claim 41, wherein the instructions further cause the one or more processors to remove a scratching effect detected in the one or more audio frames associated with the spatial audio recording.

55. The non-transitory computer-readable medium of claim 41, wherein the instructions further cause the one or more processors to reconstruct the stereo audio recording by performing a time shift between the first microphone and the second microphone based on detecting the occlusion.

56. The non-transitory computer-readable medium of claim 41, wherein the instructions further cause the one or more processors to reconstruct the stereo audio recording by performing a coloration shift between a first mono audio signal captured by the first microphone and a second mono audio signal captured by the second microphone based on detecting the occlusion.

57. The non-transitory computer-readable medium of claim 56, wherein the instructions cause the one or more processors to determine the coloration shift based on geometry information associated with the first microphone and the second microphone.

58. The non-transitory computer-readable medium of claim 41, wherein:
   the first microphone and the second microphone are part of a device that performs a camcorder function associated with the spatial audio recording.

* * * * *